United States Patent
Wang et al.

(10) Patent No.: US 11,444,650 B2
(45) Date of Patent: Sep. 13, 2022

(54) PROTECTION CASE ASSEMBLY FOR HANDHELD DEVICE

(71) Applicant: EVOLUTIVE LABS CO., LTD., Taipei (TW)

(72) Inventors: Ching-Fu Wang, Taipei (TW); Sheng-Che Su, Taipei (TW); Po-Wen Hsiao, Taipei (TW); Chia-Ho Lin, Taipei (TW)

(73) Assignee: EVOLUTIVE LABS CO., LTD., Taichung (TW)

( * ) Notice: Subject to any disclaimer, the term of this patent is extended or adjusted under 35 U.S.C. 154(b) by 0 days.

(21) Appl. No.: 16/927,870

(22) Filed: Jul. 13, 2020

(65) Prior Publication Data
US 2021/0297105 A1    Sep. 23, 2021

(30) Foreign Application Priority Data

Mar. 23, 2020   (TW) .................... 109109698

(51) Int. Cl.
*H04B 1/3888*   (2015.01)
*G03B 11/04*   (2021.01)
(52) U.S. Cl.
CPC ......... *H04B 1/3888* (2013.01); *G03B 11/043* (2013.01); *G03B 11/045* (2013.01)
(58) Field of Classification Search
CPC .... H04B 1/3888; G03B 11/045; G03B 11/043
USPC ..................................................... 455/575.8
See application file for complete search history.

(56) References Cited

U.S. PATENT DOCUMENTS

| 8,442,604 B1 | 5/2013 | Diebel |
| 2021/0208477 A1* | 7/2021 | Ma .................... G03B 17/12 |

FOREIGN PATENT DOCUMENTS

| CN | 207099125 U | 3/2018 |
| CN | 208806866 U | 4/2019 |
| CN | 110730261 A | 1/2020 |
| EP | 3331225 A1 | 6/2018 |

OTHER PUBLICATIONS

Office Action and Cited References dated Feb. 4, 2021 issued by the Taiwan Intellectual Property Office for the corresponding application No. 109203319e01 (patent document No. TWM600064U).
Office Action and Cited References dated Nov. 23, 2020 issued by Taiwan Intellectual Property Office for the Taiwan Corresponding Application No. 109109698.
Search Report dated Dec. 14, 2020 issued by European Patent Office for the European Corresponding Application No. 20186014.5-1216.
Office Action and Cited References dated Feb. 18, 2021 issued by China National Intellectual Property Administration for the China Corresponding Application No. 202021637019.4.

* cited by examiner

*Primary Examiner* — Eugene Yun
(74) *Attorney, Agent, or Firm* — WPAT, P.C., Intellectual Property Attorneys; Anthony King

(57) ABSTRACT

The present disclosure provides a protection case assembly for a handheld device. The protection case assembly includes a main case and a frame. The main case has an accommodating space configured to accommodate the handheld device, and an opening disposed correspondingly to a lens module of the handheld device. The frame is detachably disposed in the opening, and includes a groove set configured to receive the main case in the opening.

13 Claims, 28 Drawing Sheets

PROTECTION CASE ASSEMBLY FOR HANDHELD DEVICE

PRIORITY CLAIM AND CROSS-REFERENCE

This application claims priority of Taiwan patent application Ser. No. 109109698 filed on Mar. 23, 2020, which is incorporated by reference in its entirety.

TECHNICAL FIELD

The present invention relates to a protection case assembly, and more particularly to a protection case assembly for a handheld device.

DISCUSSION OF THE BACKGROUND

With the development of technologies, a current handheld device usually has, in addition to a call function, functions of certain consumer electronic products, for example, the common image capturing function. Thus, a current handheld device is usually provided with an image capturing element. A lens module of the image capturing element needs to be exposed outside the handheld device. To install a protection accessory to the handheld device having the lens module, the protection accessory needs a corresponding structure in order to avoid influences on the image capturing function.

However, in current related protection accessories, a structure corresponding to the lens module of a handheld device is mostly a basic opening. Such structure provides a relatively low level of protection for the lens module, and at the same time does not offer other additional effects. Therefore, there is significant room for improvement of the structure of a current protection accessory for a handheld device.

SUMMARY

In view of the above, it is an object of the present invention to provide a protection case assembly capable of enhancing protection for a lens module of a handheld device.

One aspect of the present invention provides a protection case assembly for a handheld device. The protection case assembly includes a main case and a frame. The main case has an accommodating space configured to accommodate the handheld device, and an opening disposed correspondingly to a lens module of the handheld device. The frame is detachably disposed in the opening, and includes a groove set configured to receive the main case in the opening.

In some embodiments, the main case further includes a backplate corresponding to a back surface of the handheld device. The opening is provided on the backplate. The groove set is configured to receive the backplate of the main case in the opening.

In some embodiments, the opening has an inner peripheral surface. The frame has an outer peripheral surface corresponding to the inner peripheral surface. The groove set includes at least one groove formed on the outer peripheral surface and configured to receive the main case in the opening.

In some embodiments, the inner peripheral surface has a first inner peripheral surface part and a second inner peripheral surface part opposite to the first inner peripheral surface part. The outer peripheral surface has a first outer peripheral surface part corresponding to the first inner peripheral surface peripheral part and a second outer peripheral surface part corresponding to the second inner peripheral surface part. The at least one groove includes a first groove and a second groove. The first groove is formed on the first outer peripheral surface part, and includes two first protrusions, between which the main case is received. The second groove is formed on the second outer peripheral surface part, and includes two second protrusions, between which the main case is received.

In some embodiments, the opening forms a third protrusion and a fourth protrusion on the first inner peripheral surface part and the is second inner peripheral surface part, respectively. The third protrusion is received between the first protrusions, and the fourth protrusion is received between the second protrusions.

In some embodiments, the inner peripheral surface has a third inner peripheral part adjacent to the first inner peripheral surface part and the second inner peripheral surface part, and a fourth inner peripheral surface part opposite to the third inner peripheral surface part. The outer peripheral surface has a third outer peripheral surface part and a fourth outer peripheral surface part. The third outer peripheral surface part has a flat area corresponding to the third inner peripheral surface part, and a protrusion abutted against a surface of the backplate facing the accommodating space. The fourth outer peripheral surface part has a second flat area corresponding to the fourth inner peripheral surface part, and a protrusion abutted against the surface of the backplate facing the accommodating space.

In some embodiments, the frame further includes a pad portion, and the pad portion protrudes toward the accommodating space when the frame is disposed in the opening.

In some embodiments, the pad portion is provided at the frame correspondingly to an encirclement of the frame.

In some embodiments, the material hardness of the groove set is more than the material hardness of the pad portion.

In some embodiments, between the surface of the pad portion facing the accommodating space and the surface of the backplate facing the accommodating space is a height difference.

In some embodiments, the height difference is between 0.1 mm and 1 mm.

The present invention further provides a protection case assembly for a handheld device. The protection case assembly includes a main case and a frame. The main case has an accommodating space configured to accommodate the handheld device, and a backplate provided with an opening corresponding to a lens module of the handheld device. The frame is detachably disposed in the opening, and includes a first frame part corresponding to a first inner peripheral surface of the opening, a second frame part opposite to the first frame part and corresponding to a second inner peripheral surface of the opening, a third frame part corresponding to a third inner peripheral surface of the opening, and a fourth frame part opposite to the third frame part and corresponding to a fourth inner peripheral surface of the opening. On a first cross section of the opening, the first frame part forms a first groove toward the first inner peripheral surface, and the first inner peripheral surface is received between two protrusions of the first groove. On a second cross section of the opening, the third frame part forms a first L shape, and a protrusion of the first L shape is abutted against the backplate from the accommodating space.

In some embodiment, the first frame part is adjacent to the third frame part and the fourth frame part. The second frame part is adjacent to the third frame part and the fourth frame part. On a first cross section, the second frame part forms a second groove toward the second inner peripheral surface, and the second inner peripheral surface is received between two protrusions of the second groove. On a second cross section, the fourth frame part forms a second L shape, and a protrusion of the second L shape is abutted against the backplate from the accommodating space.

In some embodiments, the opening forms a protrusion on the first inner peripheral surface. The protrusion of the first inner peripheral surface is received between the two protrusions of the first groove. On the first cross section, the thickness of the protrusion of the first inner peripheral surface is less than the thickness of the backplate.

In some embodiments, the first cross section crosses the second cross section cross, and the first cross section and the second cross section individually cross an extension surface of the backplate.

BRIEF DESCRIPTION OF THE DRAWINGS

Embodiments of the present invention may be best understood by the detailed description given with the accompanying drawings below. It should be noted that, the features may not be drawn according to actual sizes. In fact, for clarity of discussion, sizes of various features may be increased or decreased as desired.

DETAILED DESCRIPTION

Figure 1A:
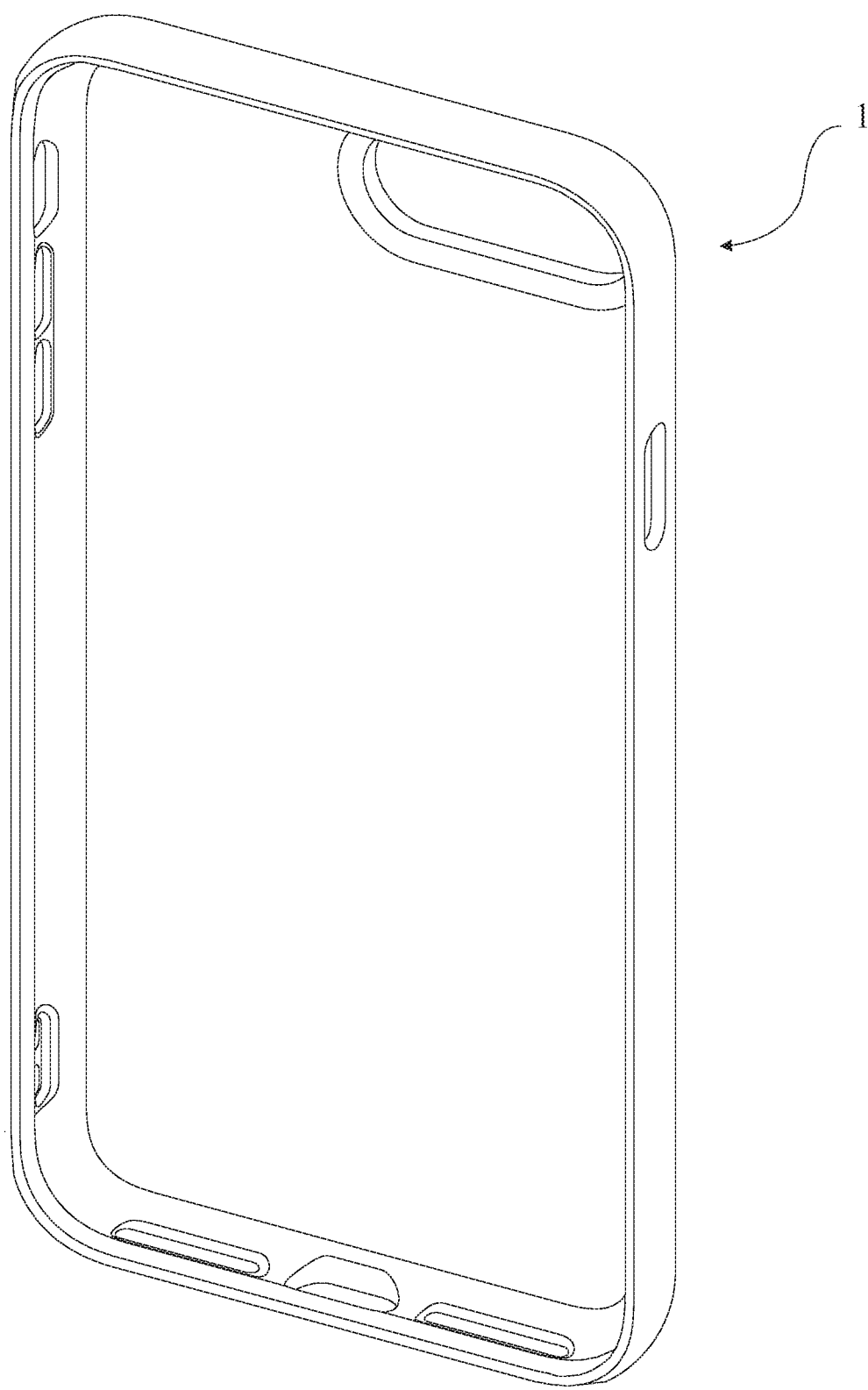
FIG. 1A is a three-dimensional diagram of a protection case assembly according to some embodiments of the present invention.

The following disclosure provides different embodiments or practical examples of different features of subjects for implementation. Specific practical examples of assemblies and configurations are described below to simplify the present invention. It should be noted that, the assemblies and configurations are practical examples and are not to be construed as limitations. In the present invention, a first feature formed above or on a second feature in the description may include an embodiment in which the first feature and the second feature are formed in a direct contact manner, and may include an embodiment in which an additional feature is thrilled between the first feature and the second feature such that the first feature and the second feature may not be in direct contact. Further, drawing symbols and/or characters may be repeated in the embodiments. Such repetition is for the purpose of simplification and clarity, and does not indicate relationships of the embodiments and/or configurations discussed.

Embodiments of the present invention are described in detail below. However, it should be understood that the present invention provides numerous suitable concepts that may be embodied in multiple specific scenarios. The discussed embodiments are illustrative and do not form limitations to the scope of the present invention.

Further, for better description, terms such "below", "under", "above", "an upper part", "a lower part", "left" and "right", and relative spatial terms of similar terms thereof may be used to describe an illustrated relationship between one element or feature and one other (or more) element or feature in the drawings. Apart from the directions depicted in the drawings, the relative spatial terms are also meant to cover different directions of a device during use or operation thereof. An apparatus may be directed by other means (rotated by 90 degrees or in another direction), and the relative spatial descriptive terms used in the disclosure may be similarly explained. It should be understood that, when an element is defined as being "connected to" or "coupled to" another element, the element may be directly connected or coupled to another element, or an intermediate element may be present.

Value ranges and parameters for describing general ranges of the present invention are approximate values, and values given in specific embodiments are reported as accurately as possible. However, some values may contain errors caused by discovered standard errors in individual test and measurement values. Further, the term "approximately" usually means that a given value or range is within an error of ±10%, ±5%, ±1% or ±0.5%. In substitution, a person skilled in the art would consider that the term "approximately" means an acceptable standard error of an average value. Except for practical operation/working examples, unless otherwise explicitly specified, value ranges, quantities, values and percentages (for example, the number of materials, duration of time, temperature, operating conditions, ratios of quantities and similar or equivalent) should be understood as being modified by the term "approximately". Therefore, unless otherwise specified, the values and parameters given in the invention and the appended claims may be variable similar values. At least, numerical parameters should be understood based on the reported significant digits and by applying general rounding techniques. A range may be presented herein from one endpoint to another endpoint or between two endpoints. Unless otherwise specified, all ranges disclosed in the description include endpoints. The term "substantially coplanar" may refer to two surfaces that are within a few micrometers (μm) along the same plane (such as within 10 μm, 5 μm, 1 μm, or 0.5 μm along the same plane). Where values or characteristics are said to be "substantially" the same, the term may mean that the values are within ±10%, ±5%, ±1% or ±0.5% of the average of the values.

A protection case assembly disclosed by the present invention is configured to accommodate a handheld device. The protection case assembly includes a main case and a frame detachably disposed in an opening of the main case. The frame may serve as a liner, and conformally encircles an inner peripheral surface of the opening. When the frame and the main case are in a complete received state, the frame and the main case at least simultaneously have two different receiving structures. The two different receiving structures may include a structure in which the frame and the main case are abutted by a single side, or at least may include a structure in which the frame is designed with two walls that clamp the main case. It is an object of the present invention to provide at least two different receiving structures for enhancing convenience for installing/removing the frame for a user. It is another object of the present invention to provide at least two different receiving structures, such that at least two different types of stress is produced and the stress is fed back to the user by multiple predetermined contact points of the frame and the main case when the frame and the main case are separated or coupled, so as to enable the user to sense whether the frame and the main case are completely fittingly received.

Figure 1B:
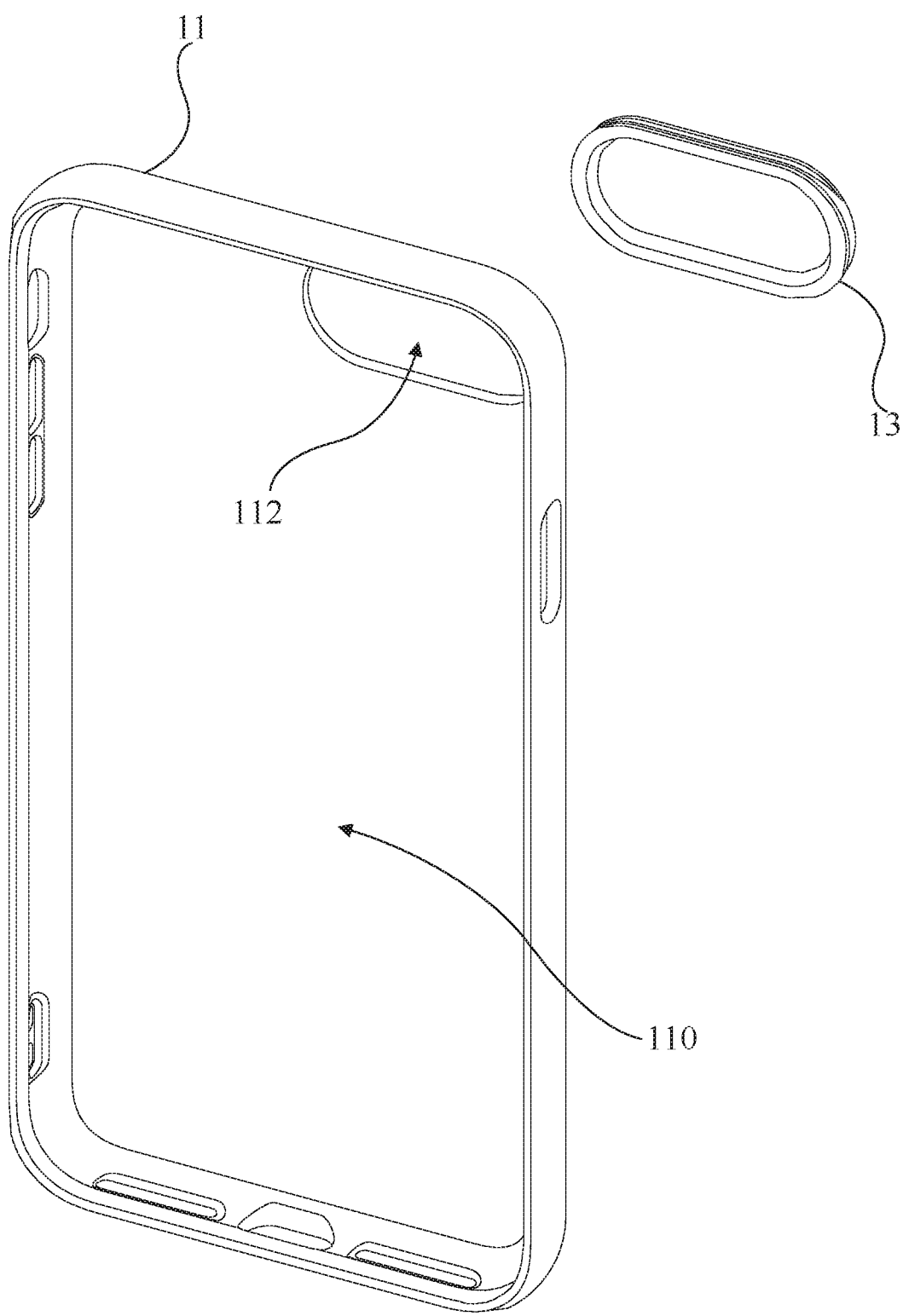
FIG. 1B is an exploded diagram of a protection case assembly according to some embodiments of the present invention.
Figure 1C:
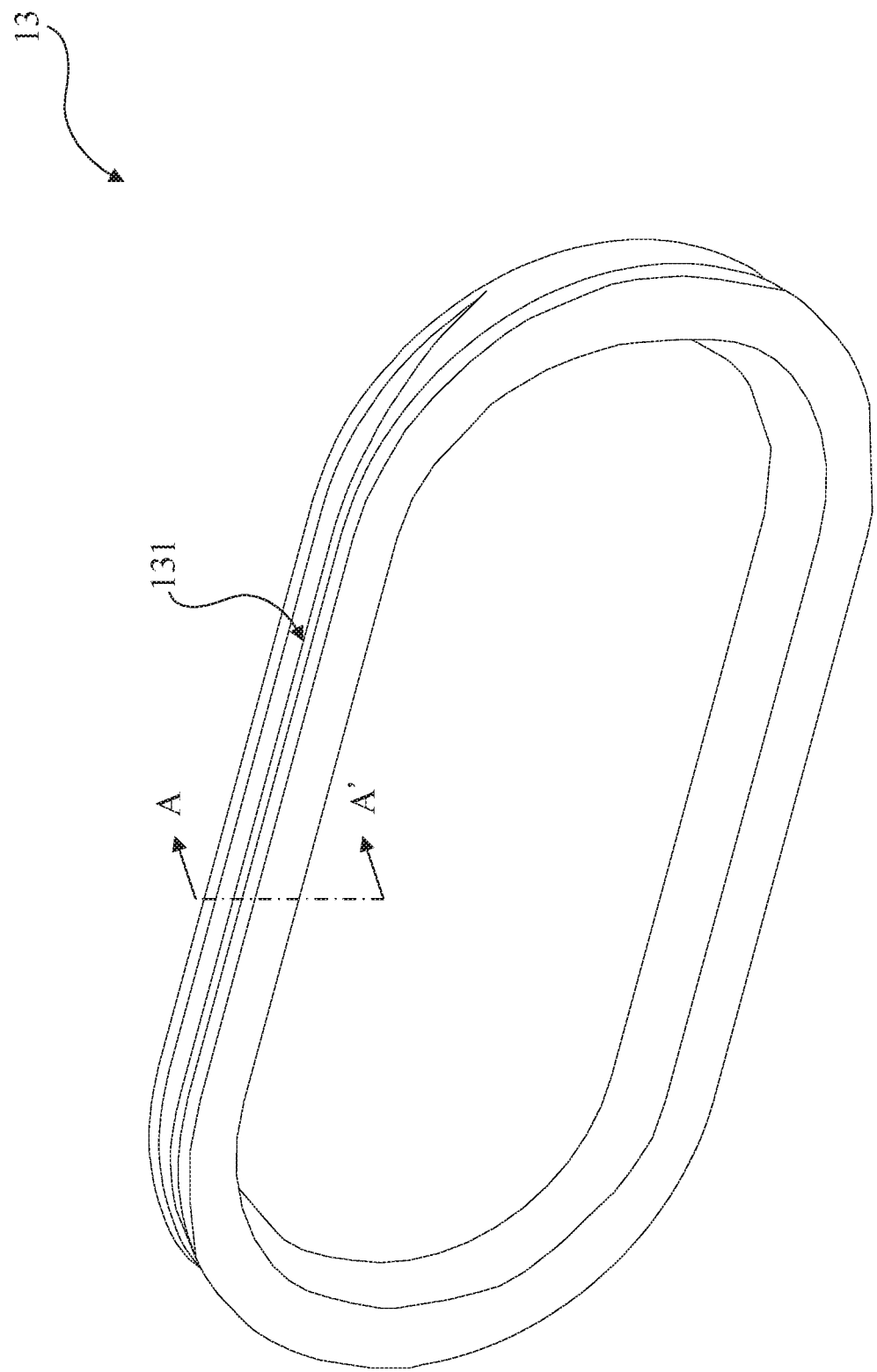
FIG. 1C is a three-dimensional diagram of a frame according to some embodiments of the present invention.
Figure 1D:
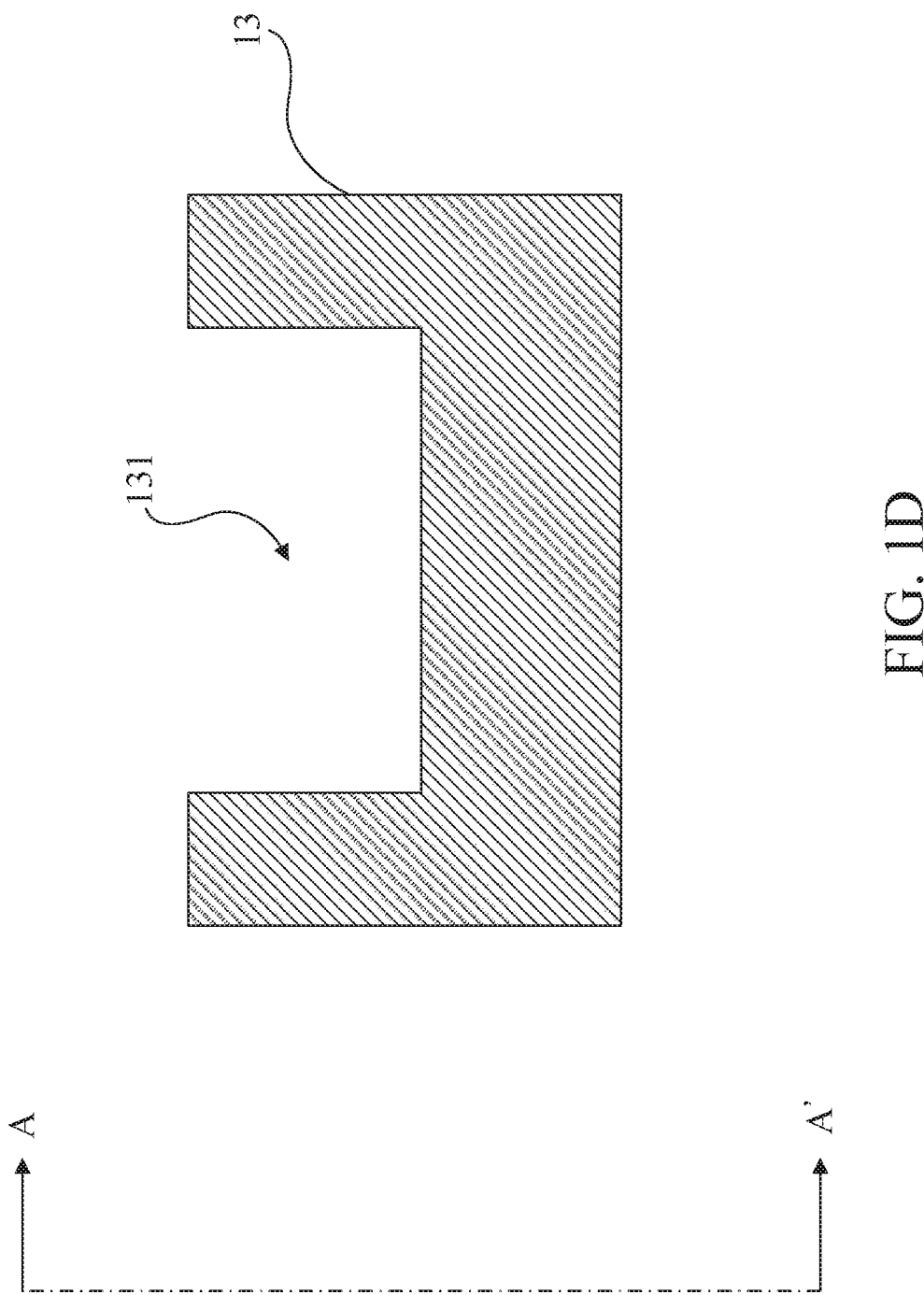
FIG. 1D is a section diagram of a frame according to some embodiments of the present invention.
Figure 1E:
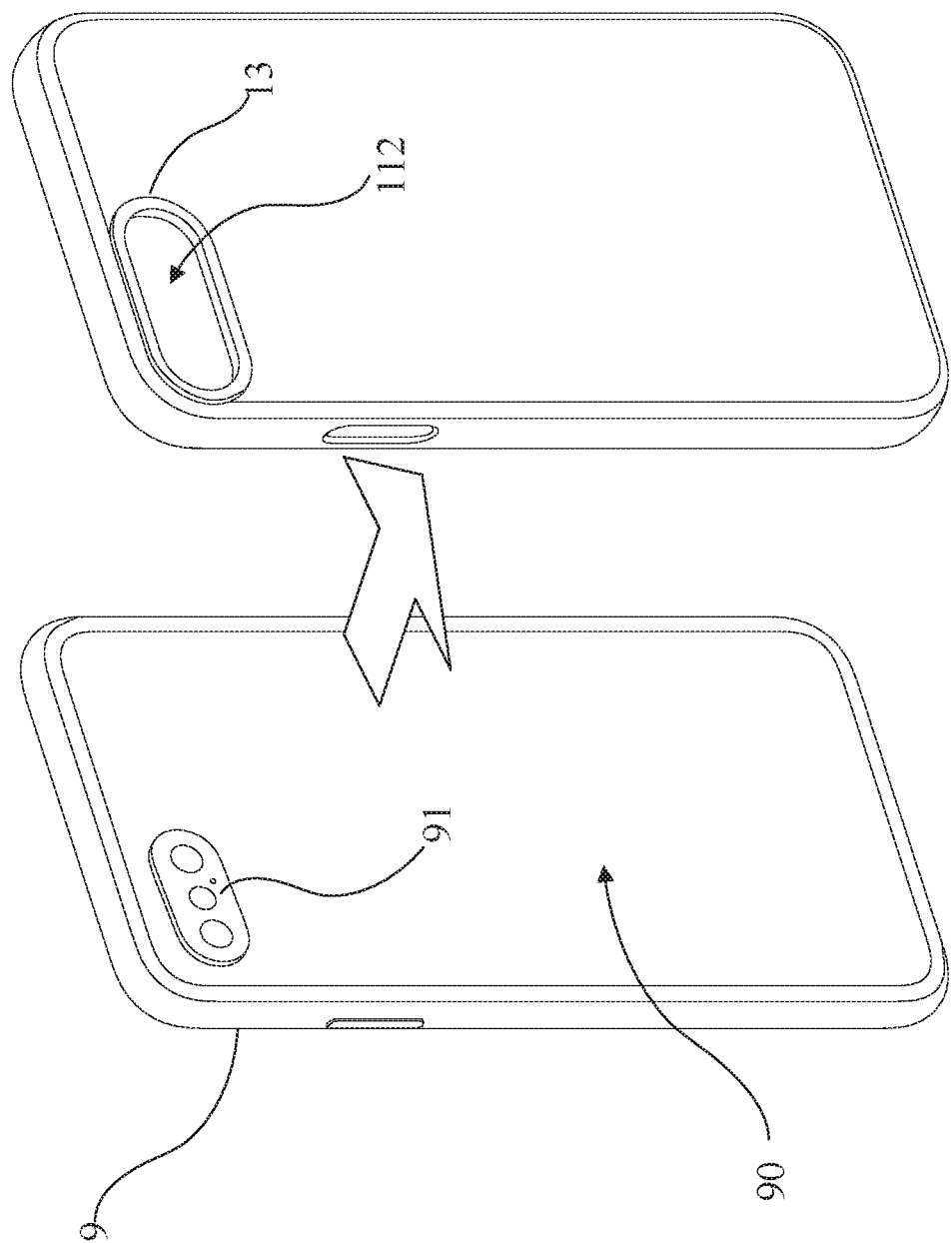
FIG. 1E and FIG. 1F are schematic diagrams of a protection case assembly in use according to some embodiments of the present invention.
Figure 1F:
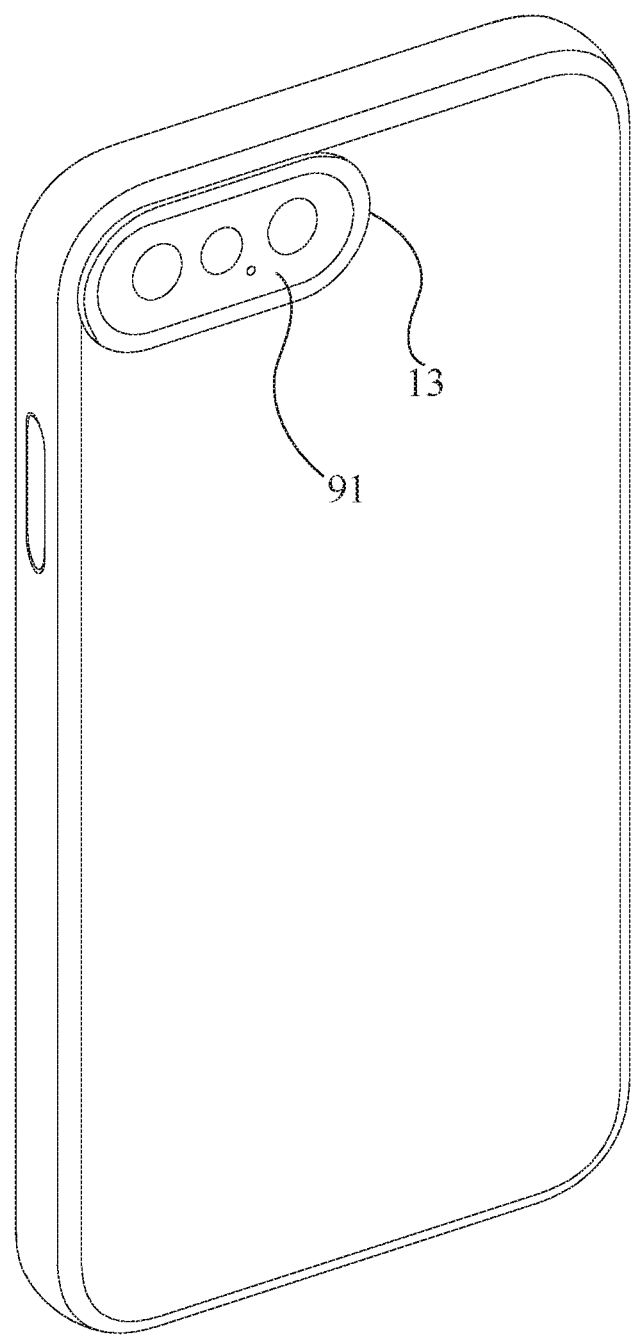

Refer to FIG. 1A to FIG. 1F. FIG. 1A shows a three-dimensional diagram of a protection case assembly 1 according to some embodiments of the present invention. FIG. 1B shows an exploded diagram of the protection case assembly according to some embodiments of the present invention. The protection case assembly 1 includes a main case 11 and a frame 13. FIG. 1C shows a three-dimensional diagram of the frame 13 according to some embodiments of the present invention. FIG. 1D shows a section diagram of the frame 13 along a section line A-A' in FIG. 1C. FIG. 1E and FIG. 1F are schematic diagrams of the protection case assembly 1 in use according to some embodiments of the present invention.

Specifically, the main case 11 has an accommodating space 110 configured to accommodate a handheld device 9. The handheld device 9 is detachably disposed in the accommodating space 110 of the min case 11. The main case 11 has an opening 112, and the frame 13 is detachably disposed in the opening 112. In some embodiments, the frame 13 has a groove set 131 configured to fittingly receive the main case 11 in the opening 112.

More specifically, the handheld device 9 includes a lens module 91 provided on a back surface 90 of the handheld device 9. The opening 112 of the main case 11 is formed on a position corresponding to the lens module 91 on the back surface 90, and is configured to expose the lens module 91 when the handheld device 9 is disposed in the accommodating space 110. Thus, the lens module 91 may be prevented from being blocked.

On the other hand, the shape of the space defined by the hollow part of the frame 13 matches the shape of the lens module 91 protruding from the back surface 90. Thus, when the frame 13 is installed in the opening 112, the space defined by the hollow part of the frame 13 may be coupled to the lens module 91 and provides the lens module 91 with protection, at the same time enhancing the overall aesthetic values of the protection case assembly 1.

Figure 2A:
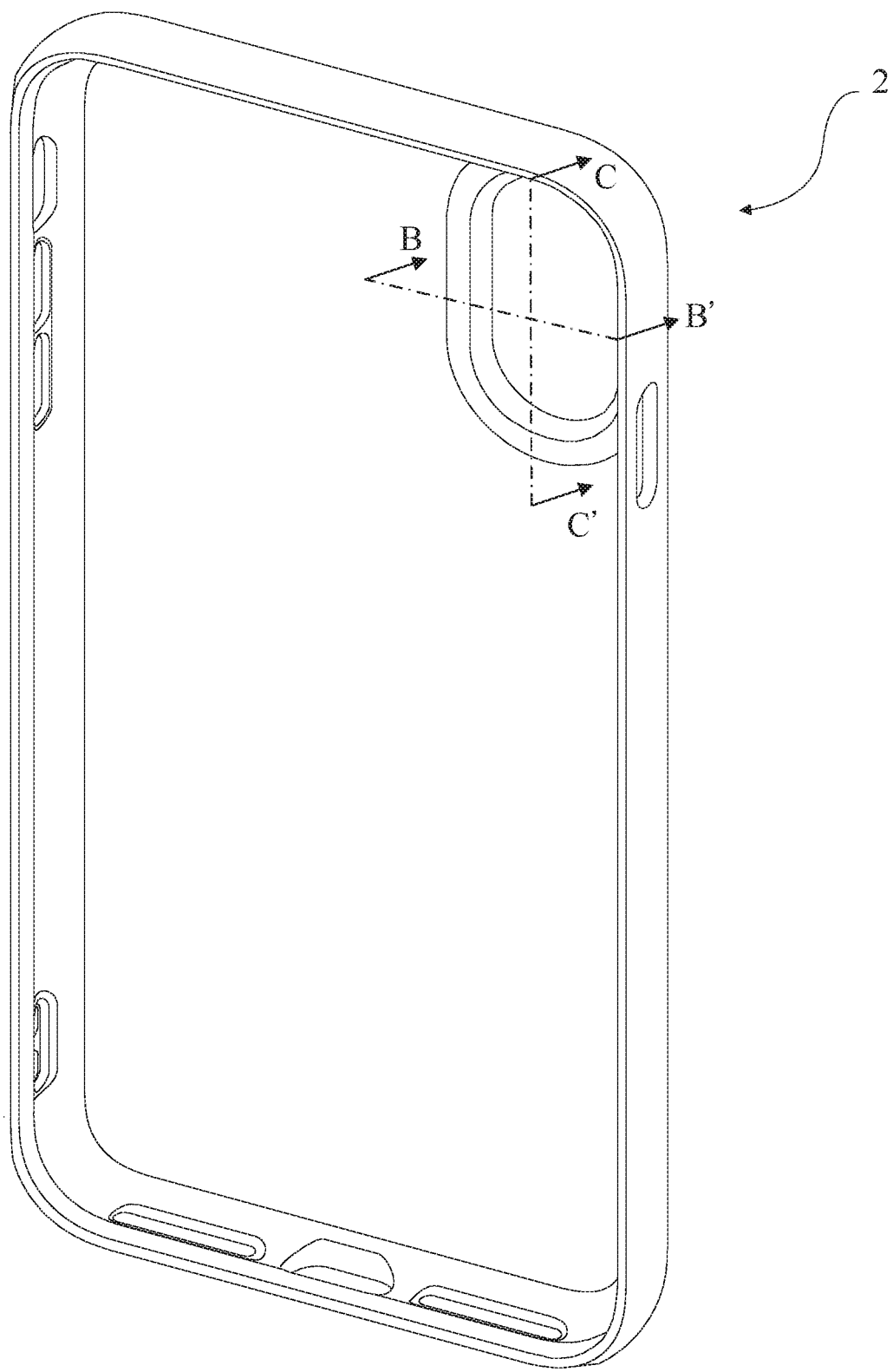
FIG. 2A is a three-dimensional diagram of a protection case assembly according to some embodiments of the present invention.
Figure 2B:
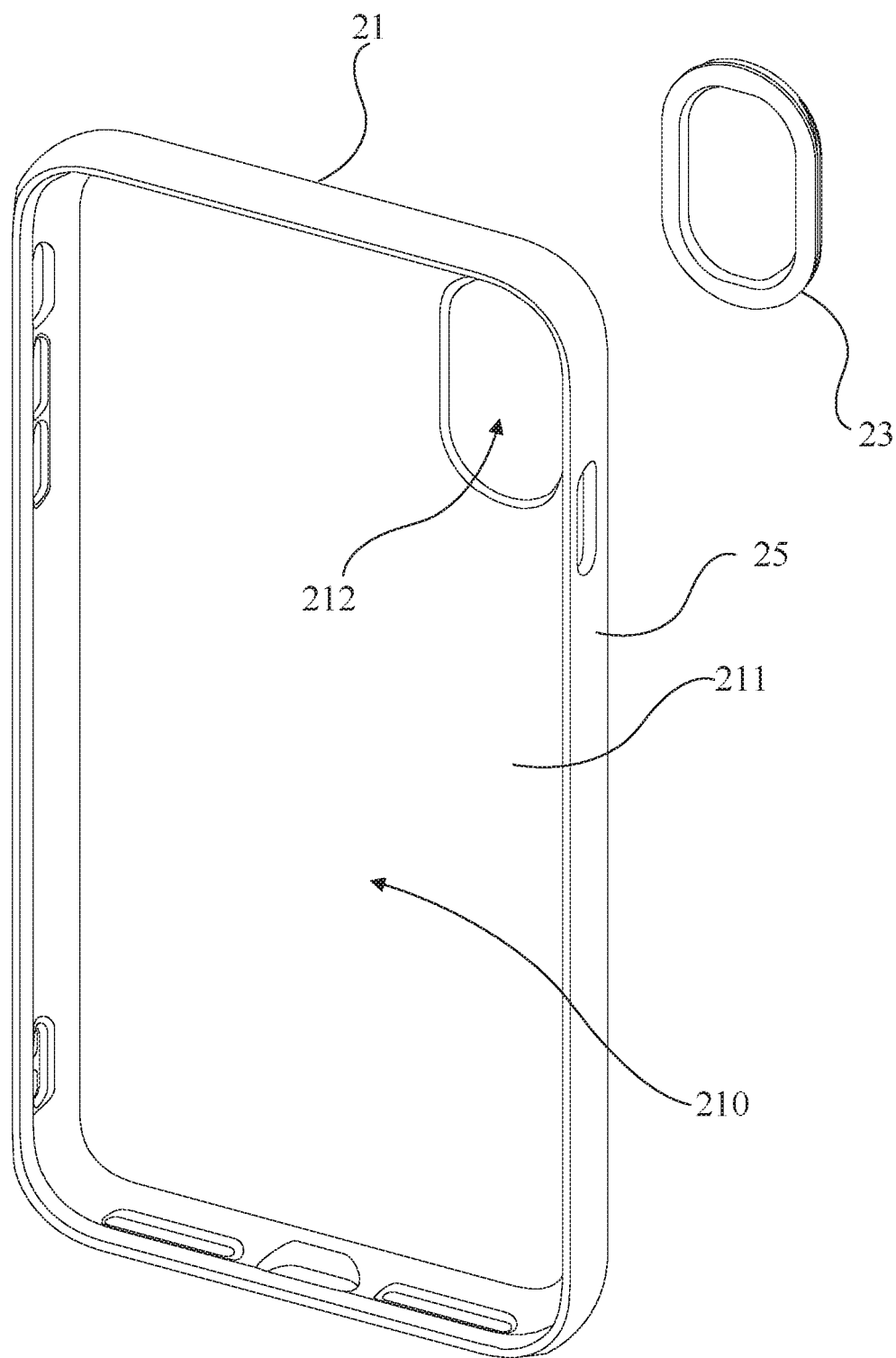
FIG. 2B is an exploded diagram of a protection case assembly according to some embodiments of the present invention.
Figure 2C:
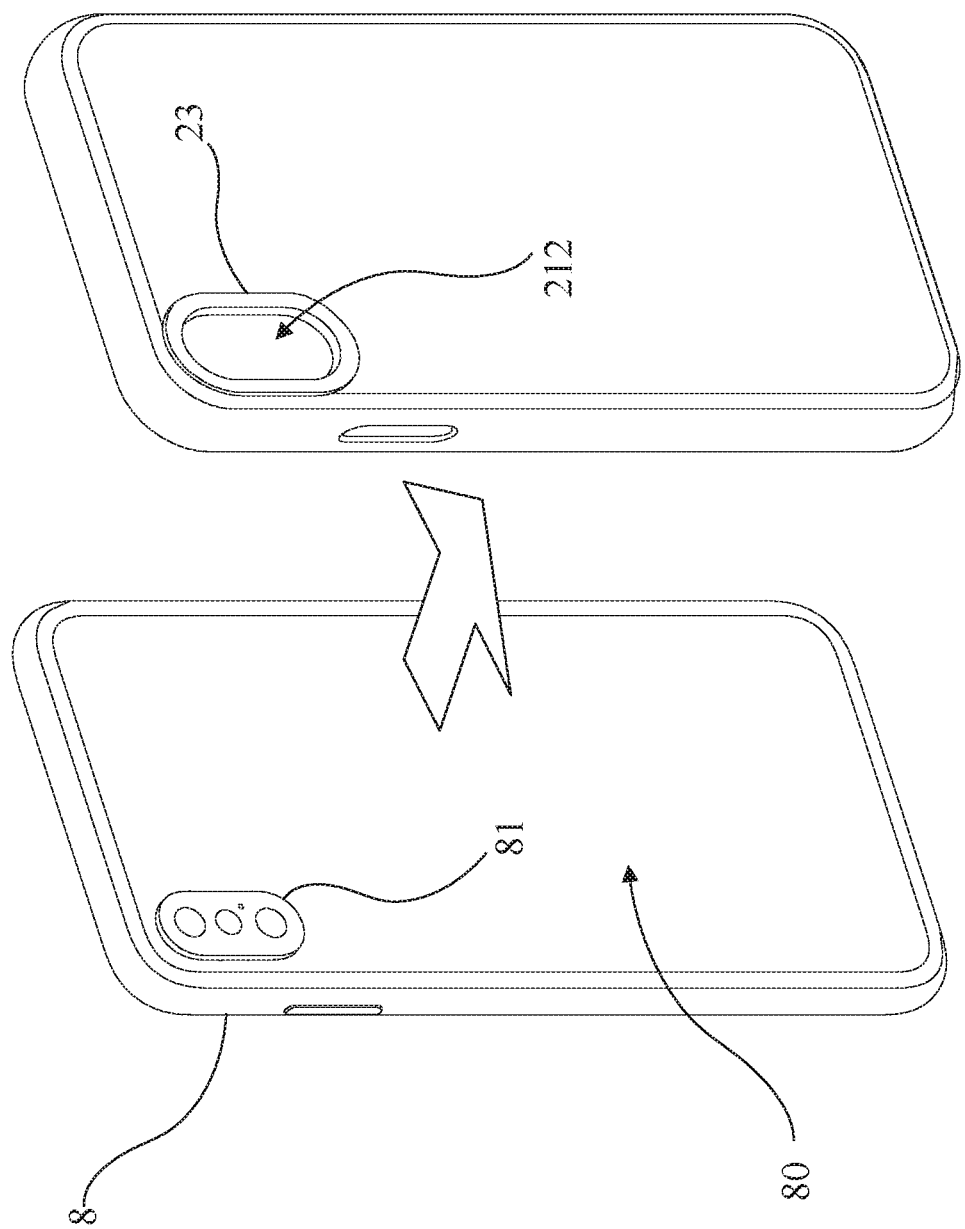
FIG. 2C is a schematic diagram of a protection case assembly in use according to some embodiments of the present invention.

Refer to FIG. 2A to FIG. 2C. FIG. 2A shows a three-dimensional diagram of a protection case assembly 2 according to some embodiments of the present invention. FIG. 2 shows an exploded diagram of the protection case assembly 2 according to some embodiments of the present invention. FIG. 2C shows a schematic diagram of the protection case assembly 2 in use according to some embodiments of the present invention. Particularly, the protection case assembly 2 includes a main case 21 and a frame 23. The main case 21 has an accommodating space 210 and a backplate 211.

In some embodiments, the accommodating space 210 of the main case 21 is defined by a rim 25 and the backplate 211 of the main case 21, and is configured to accommodate a handheld device 8. The handheld device 8 is detachably disposed in the accommodating space 210 of the main case 21. The handheld device 8 includes a lens module 81 provided on a back surface 80 of the handheld device 8. The main case 21 is provided with an opening 212 on the backplate 211 on a position corresponding to the lens module 81 so as to expose the lens module 81. Thus, the lens module 81 is prevented from being blocked. The frame 23 is detachably disposed in the opening 212.

Figure 2D:
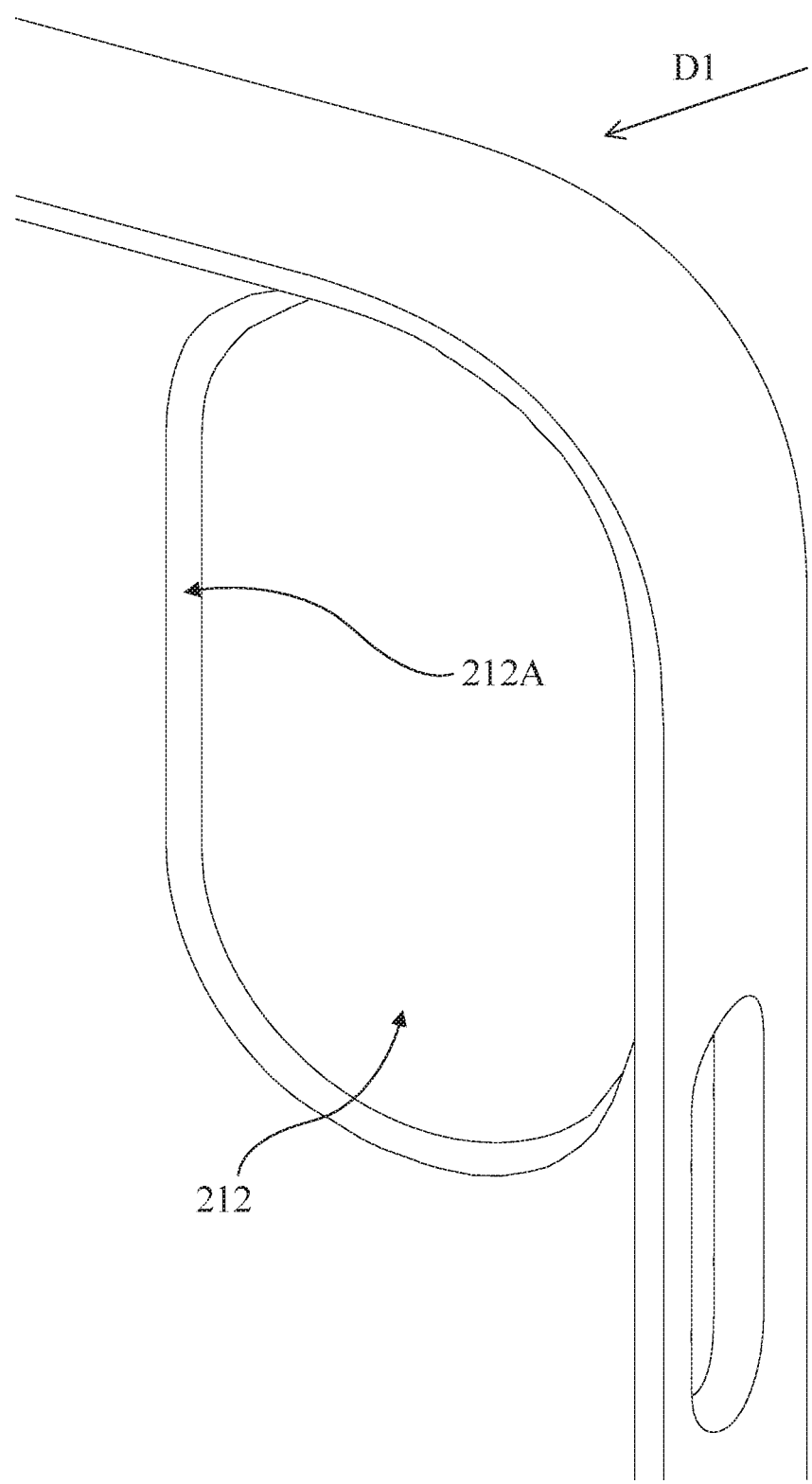
FIG. 2D is an enlarge partial diagram of a main case according to some embodiments of the present invention.
Figure 2E:
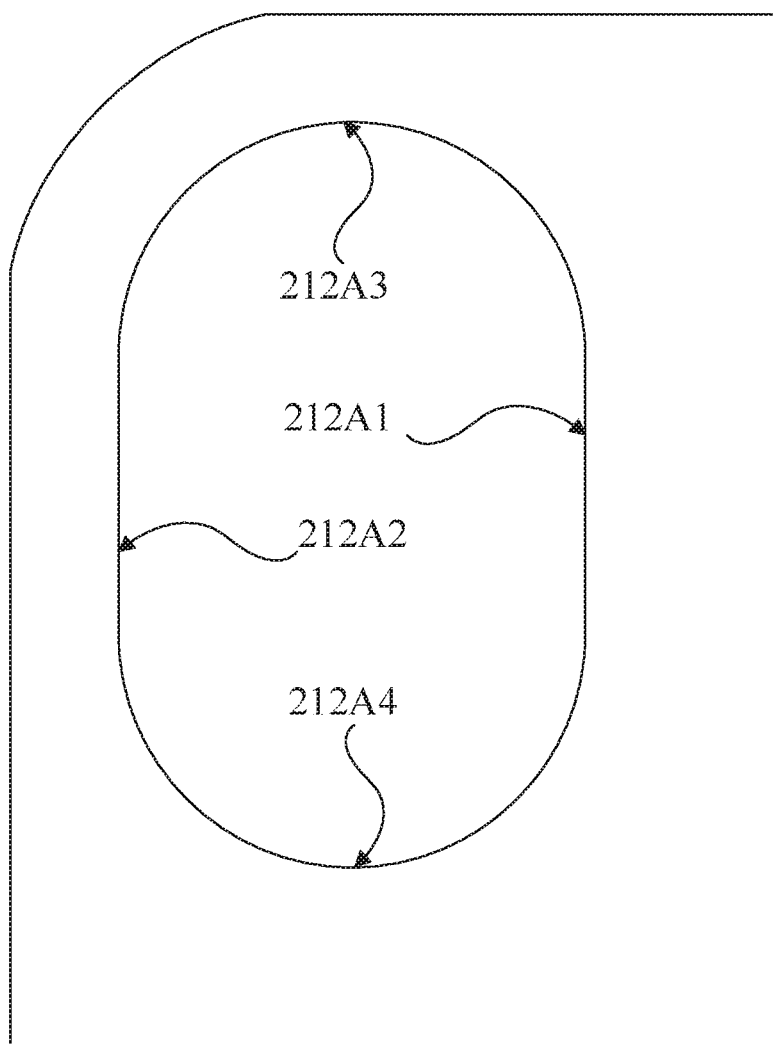
FIG. 2E is a front view of a main case according to some embodiments of the present invention.
Figure 2F:
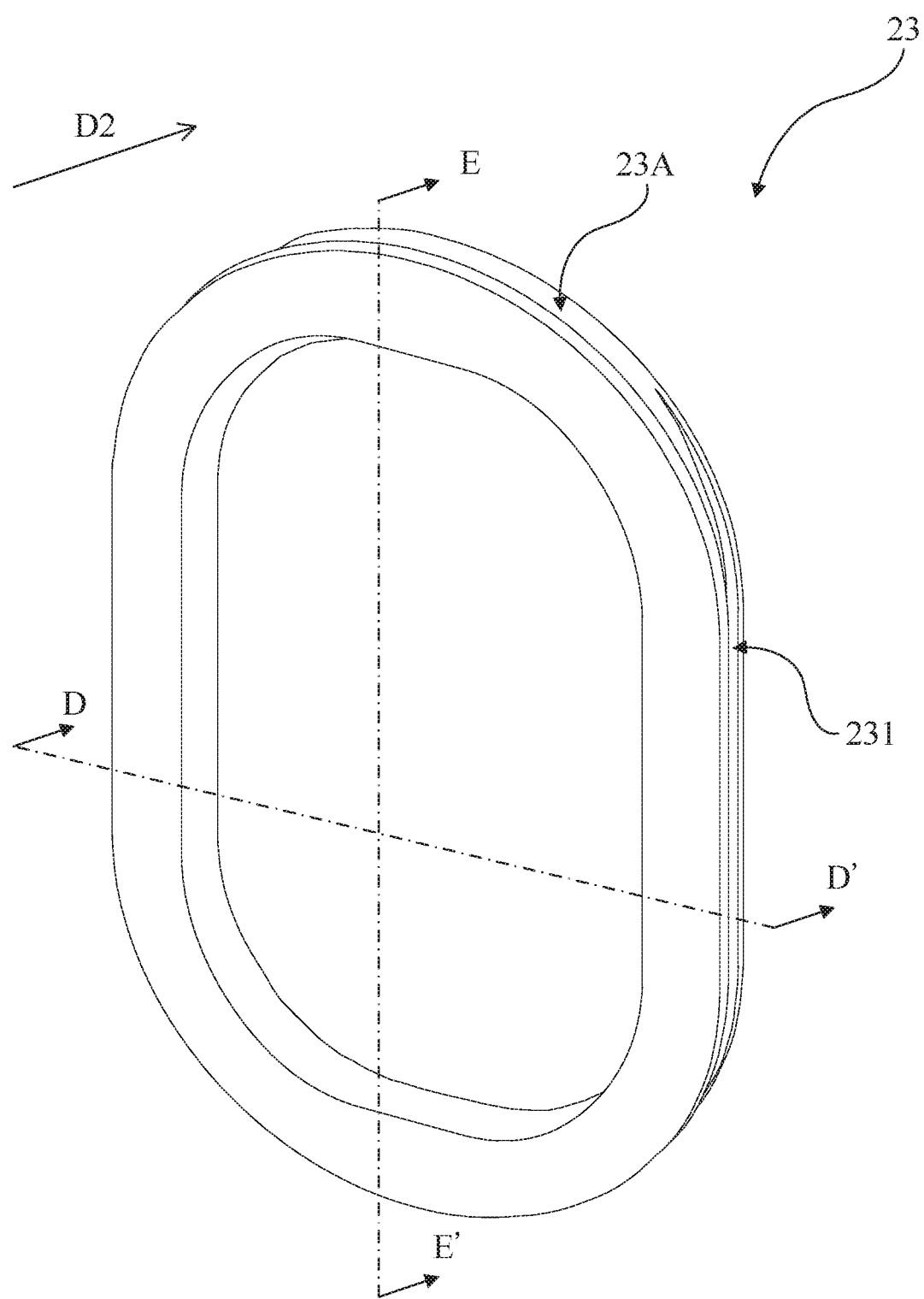
FIG. 2F is a three-dimensional diagram of a frame according to some embodiments of the present invention.
Figure 2G:
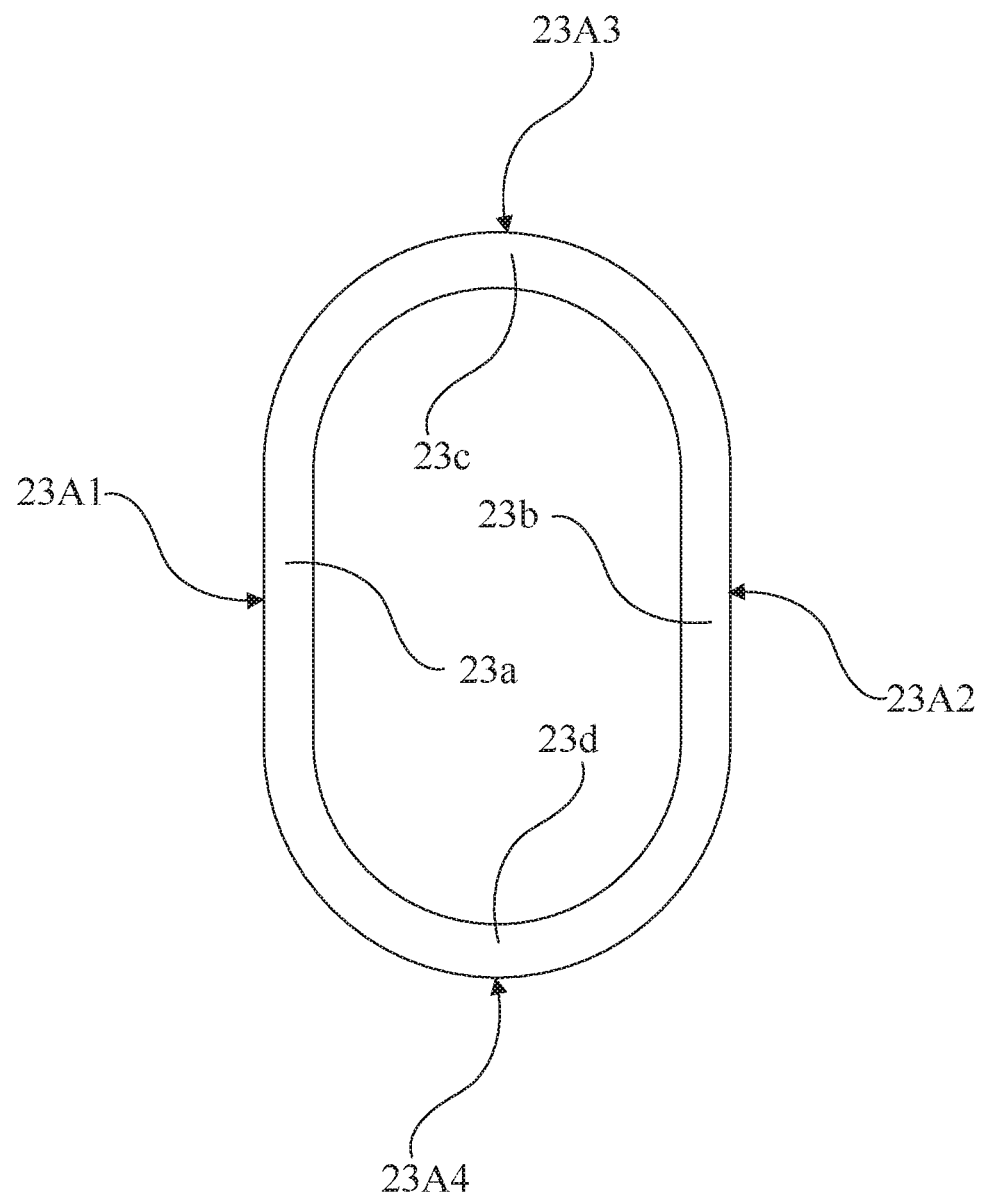
FIG. 2G is a front view of a frame according to some embodiments of the present invention.

Refer to FIG. 2D to FIG. 2G. FIG. 2D shows an enlarged partial diagram of the main case 21 according to some embodiments of the present invention. FIG. 2E shows a front view of the main case 21 in a direction D1 in FIG. 2D of the present invention. FIG. 2F shows a three-dimensional diagram of the frame 23 according to some embodiments of the present invention. FIG. 2G shows a front view of the frame 23 in a direction D2 in FIG. 2F of the present invention. Particularly, the opening 212 has an inner peripheral surface 212A encircling the opening 212. The inner peripheral surface 212A defines the hole of the opening 212, and is connected to inner and outer surfaces of the backplate 211. Corresponding to the inner peripheral surface 212A, the frame 23 has an outer peripheral surface 23A encircling the frame 23. A groove set 231 is formed on the outer peripheral surface 23A, and is configured to fittingly receive the main case 21 in the opening 212.

More specifically, in some embodiments, the inner peripheral surface 212A of the opening 212 may be divided into a first inner peripheral part 212A1, a second inner peripheral surface part 212A2, a third inner peripheral surface part 212A3 and a fourth inner peripheral surface part 212A4. In the opening 212, the first inner peripheral surface part 212A1 is opposite to the second inner peripheral surface part 212A2, and the third inner peripheral surface part 212A3 is opposite to the fourth inner peripheral surface part 212A4. In some embodiments, the third inner peripheral surface part 212A3 is adjacent to the first inner peripheral surface part 212A1 and the second inner peripheral surface part 212A2, and the fourth inner peripheral surface part 212A4 is adjacent to the first inner peripheral surface part 212A1 and the second inner peripheral surface part 212A2. In other words, the inner peripheral surface parts 212A1 to 212A4 are connected to form the inner peripheral surface 212A of the opening 212.

On the other hand, in some embodiments, the outer peripheral surface 23A of the frame 23 may be divided into a first outer peripheral surface part 23A1, a second outer peripheral surface part 23A2, a third outer peripheral surface part 23A3 and a fourth outer peripheral surface part 23A4. In some embodiments, the third outer peripheral surface part 23A3 is adjacent to the first outer peripheral surface part 23A1 and the second outer peripheral surface part 23A2, and the fourth outer peripheral surface part 23A4 is adjacent to the first outer peripheral surface part 23A1 and the second outer peripheral surface part 23A2. In other words, the outer peripheral surface parts 21A1 to 23A4 are connected to form the outer peripheral surface 23A of the frame 23.

In some embodiments, the frame 23 may be distinguished into a first frame part 23a, a second frame part 23b, a third frame part 23c and a fourth frame part 24d based on the first outer peripheral surface part 23A1, the second outer peripheral surface part 23A2, the third outer peripheral surface part 23A3 and the fourth outer peripheral surface part 23A4. In some embodiments, the first frame part 23a is adjacent to the third frame part 23c and the fourth frame part 23d, and the second frame part 23b is adjacent to the third frame part 23c and the fourth frame part 23d. In other words, the frame parts 23a to 23d are connected to form the frame 23.

In some embodiments, when the frame 23 is disposed in the opening 212, the first outer peripheral surface part 23A1 corresponds to the first inner peripheral surface part 212A1, the second outer peripheral surface part 23A2 corresponds to the second inner peripheral surface part 212A2, the third outer peripheral surface part 23A3 corresponds to the third inner peripheral surface part 212A3, and the fourth outer peripheral surface part 23A4 corresponds to the fourth inner peripheral surface part 212A4.

Figure 2H:
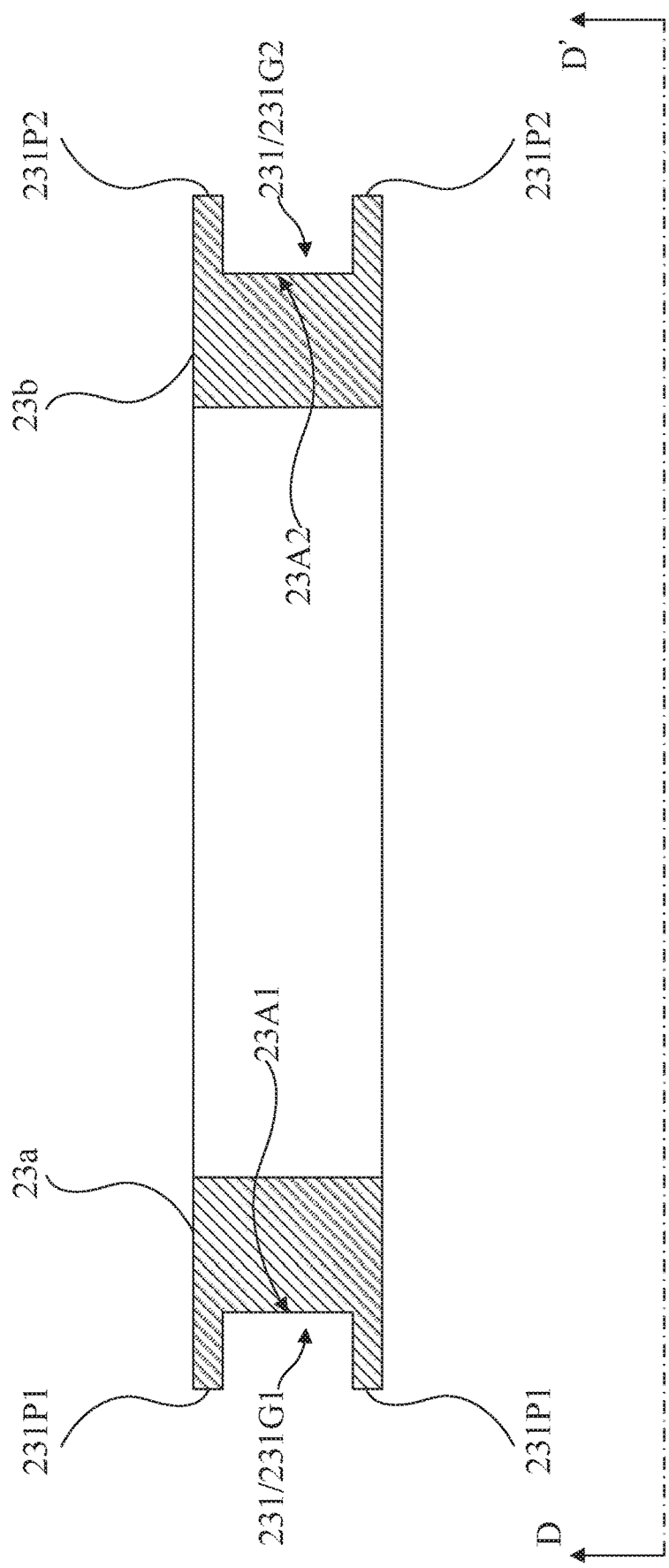
FIG. 2H is a section diagram of a frame according to some embodiments of the present invention.
Figure 2I:
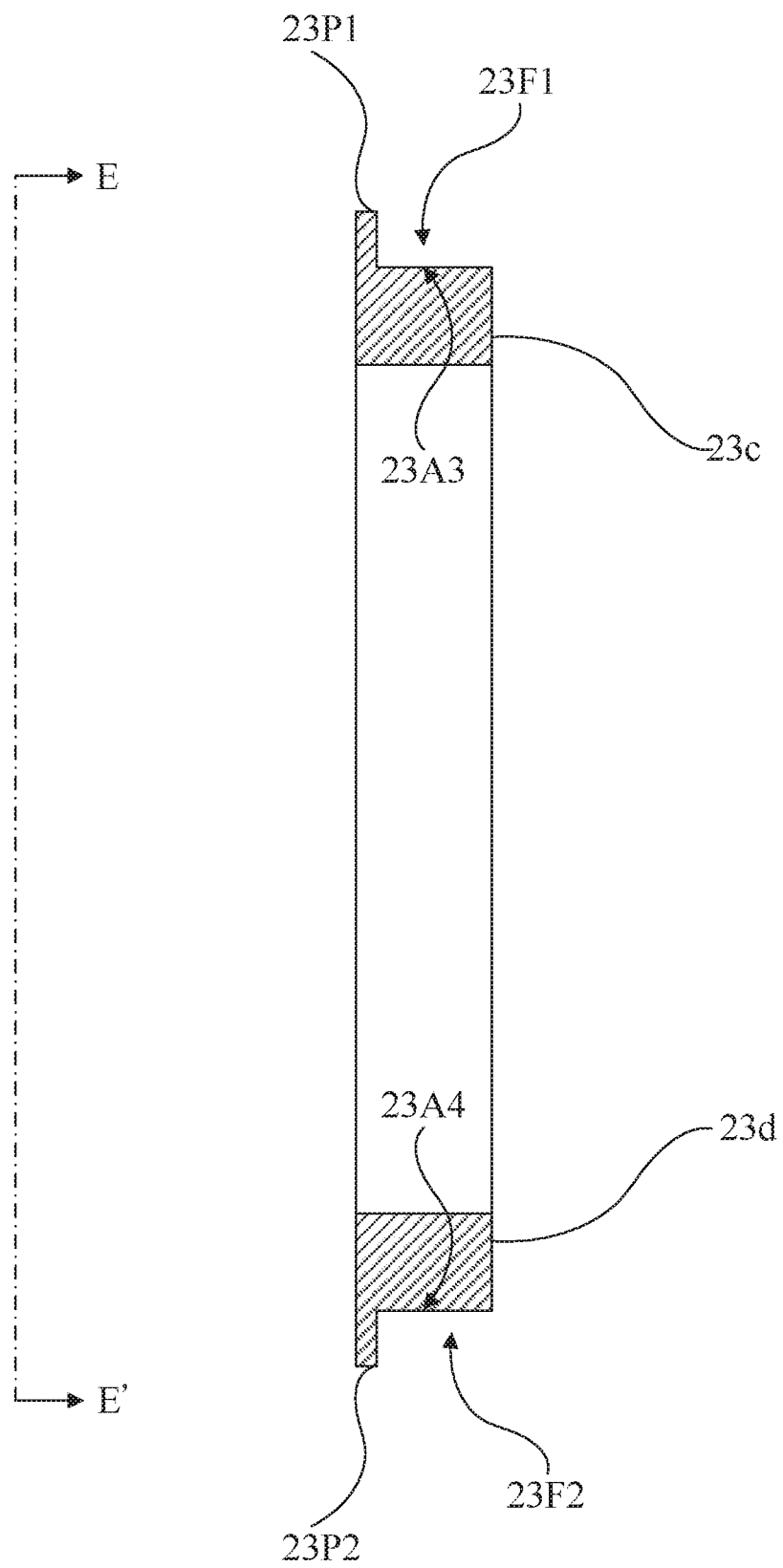
FIG. 2I is a section diagram of a frame according to some embodiments of the present invention.

Refer to FIG. 2H and FIG. 2I. FIG. 2H shows a section diagram of the frame 23 along the section line D-D' in FIG. 2F, FIG. 2I shows a section diagram of the frame 23 along the section line E-E' in FIG. 2F. Further, the groove set 231 of the frame 23 includes a first groove 231G1 and a second groove 231G2, the first groove 231G1 is formed on the first outer peripheral surface part 23A1 and includes two first protrusions 231P1, and the second groove 231G2 is formed on the second outer peripheral surface part 23A2 and includes two second protrusions 231P2.

Specifically, at the first frame part 23a, the two first protrusions 231P1 protrude on two ends of the first outer peripheral surface part 23A1 along the frame 23, and thus the two first protrusions 231P1 and the first outer peripheral surface part 23A1 jointly form the first groove 231G1. At the second frame part 23b, the two second protrusions 231P2 protrude on two ends of the second outer peripheral surface part 23A2 along the frame 23, and thus the two second protrusions 231P2 and the second outer peripheral surface part 23A2 jointly form the second groove 231G2.

On the other hand, at the third frame part 23c, the third outer peripheral surface part 23A3 of the frame 23 has a first flat area 23F1 and a protrusion 23P1. At the fourth frame part 23d, the fourth outer peripheral surface part 23A4 has a second flat area 23F2 and a protrusion 23P2. More specifically, the protrusion 23P1 protrudes only on one end of the third outer peripheral surface part 23A3 along the frame 23, and the other end of the third outer peripheral surface part 23A3 without any protrusion forms the flat area 23F1 along the frame 23. The protrusion 23P2 protrudes only on one end of the fourth outer peripheral surface part 23A4 along the frame 23, and the other end of the fourth outer peripheral surface part 23A4 without any protrusion forms the flat area 23F2 along the frame 23.

Figure 2J:
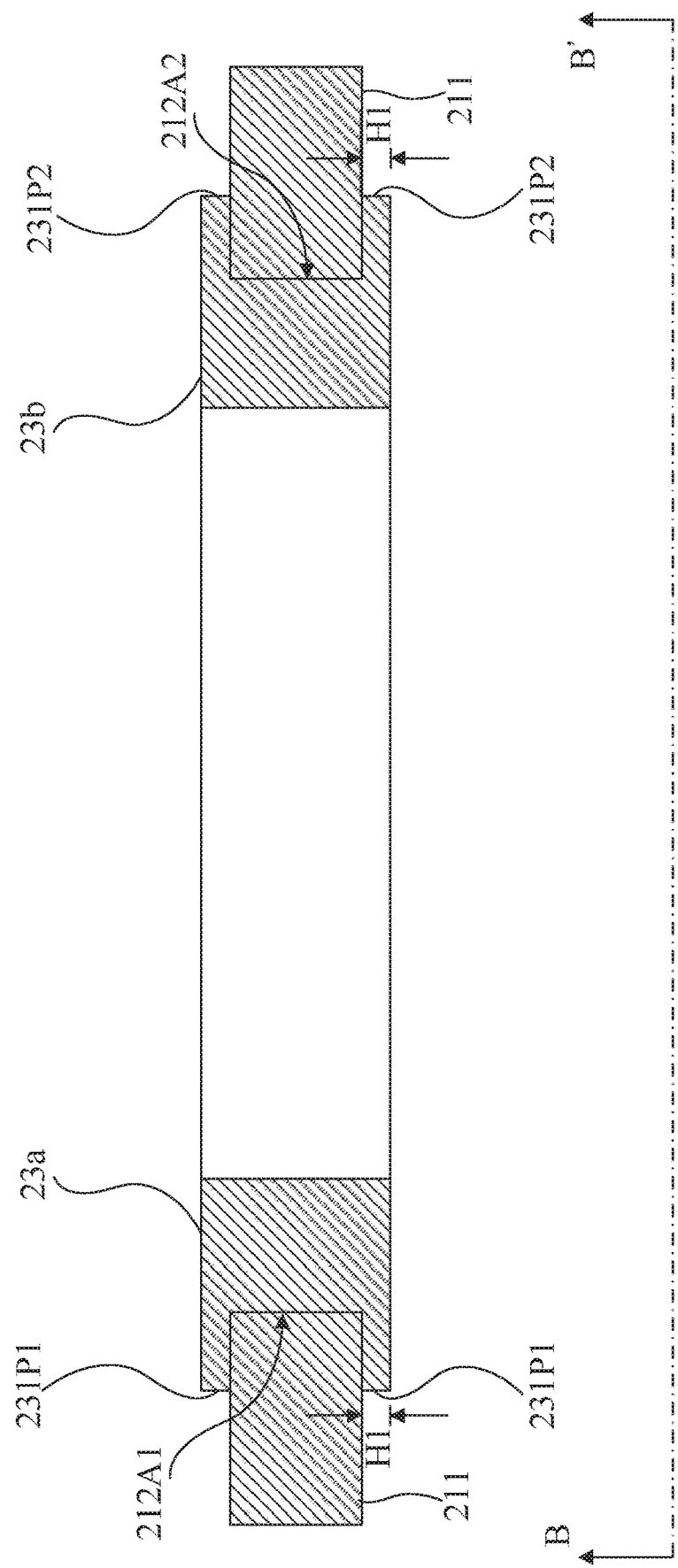
FIG. 2J is a section diagram of a protection case assembly according to some embodiments of the present invention.
Figure 2K:
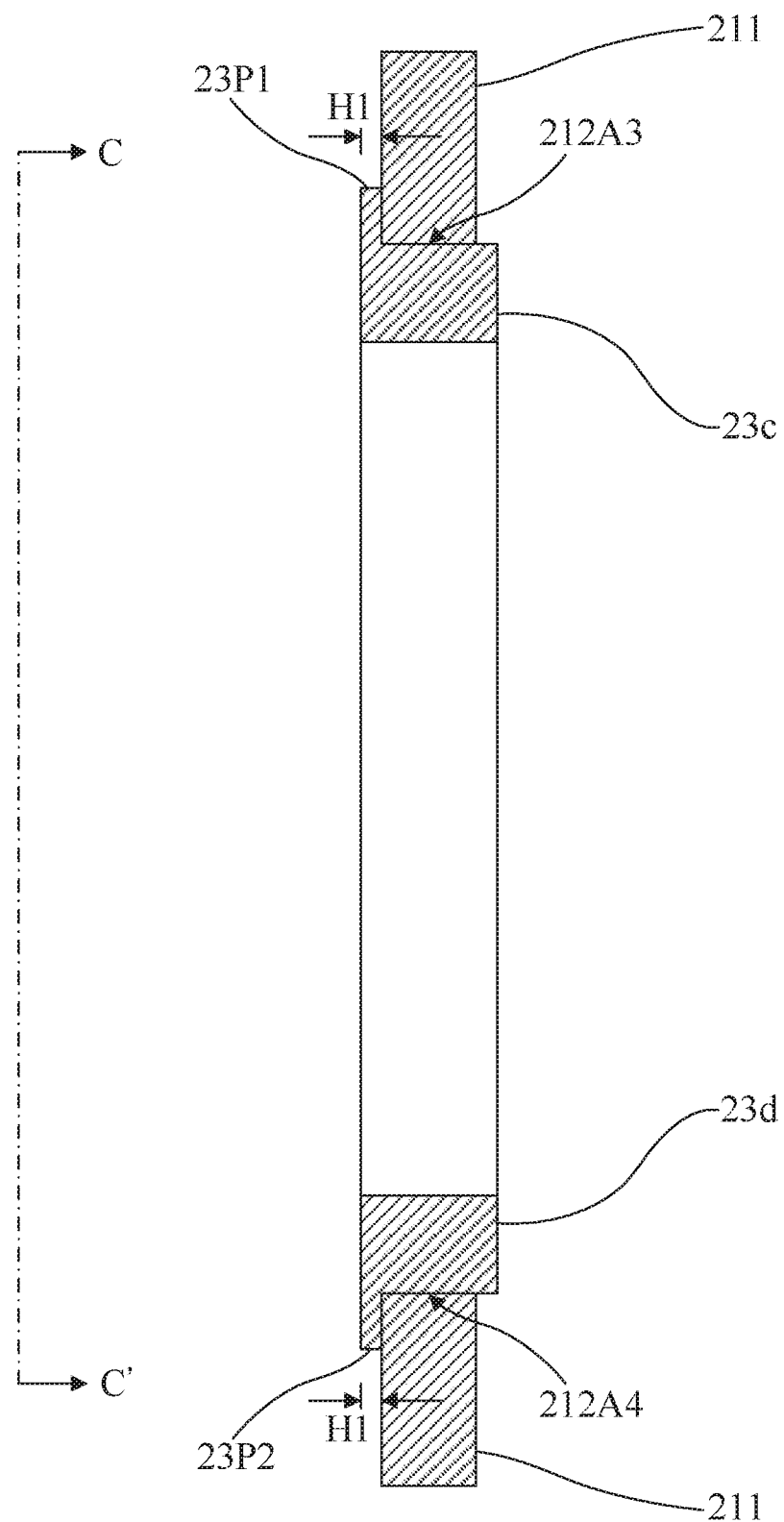
FIG. 2K is a section diagram of a protection case assembly according to some embodiments of the present invention.

Refer to FIG. 2J and FIG. 2K. FIG. 2J shows a section diagram of the protection case assembly 2 along the section line B-B' in FIG. 2A. FIG. 2K shows a section diagram of the protection case assembly 2 along the section line C-C' in FIG. 2A, Specifically, when the frame 23 is disposed in the opening 212 of the backplate 211 of the main case 21: (1) the first inner peripheral surface part 212A1 is fittingly received between the two first protrusions 231P1 of the first groove 231G1; (2) the second inner peripheral surface part 212A2 is fittingly received between the two second protrusions 231P2 of the second groove 231G2; (3) the third inner peripheral surface part 212A3 is adjacent to the first flat area 23F1 of the third outer peripheral surface part 23A3, and the protrusion 23F1 is abutted against the surface of the backplate 211 facing the accommodating space 210; and (4) the fourth inner peripheral surface part 212A4 is adjacent to the second flat area 23F2 of the fourth outer peripheral surface part 23A4, and the protrusion. 23P2 is abutted against the surface of the backplate 211 facing the accommodating space 210.

In other words, it can be understand from the cross sections of the drawings, when the frame 23 is disposed in the opening 212 of the backplate 211 of the main case 21: (1) the first frame part 23a forms the first 231G1 toward the first inner peripheral surface part 212A1, and the first inner peripheral surface part 212A1 is fittingly received between the two first protrusions 231P1 of the first groove 231G1; (2) the second frame part 23b forms the second groove 231G2 toward the second inner peripheral surface part 212A2, and the second inner peripheral surface part 212A2 is fittingly received between the two second protrusions 231P2 of the second groove 231G2; (3) the third frame part 23c substantially forms an L shape on the cross section, and the protrusion 23P1 of the L shape is abutted against the surface of the backplate 211 facing the accommodating space 210; and (4) the fourth frame part 23d substantially forms an L shape on the cross section, and the protrusion 23P2 of the L shape is abutted against the surface of the backplate 211 facing the accommodating space 210.

In some embodiments, when the frame 23 is disposed in the opening 212 of the backplate 211 of the main case 21, the first protrusions 231P1 located in the accommodating space 210, the second protrusions 231P2 located in the accommodating space 210, the protrusion 23P1 of the third outer peripheral surface part 23A3 and the protrusion 23P2 of the fourth outer peripheral surface part 23A4 are connected and appear as an encirclement. Between the surface of the connected protrusions facing the accommodating space 210 and the surface of the backplate 211 facing the accommodating space 210 is a height difference H1. With the height difference H1, the frame 23 may pad the backplate 211 away from the back surface 80 of the handheld device 8, so as to prevent the backplate 211 from directly contacting the back surface 80 of the handheld device 8, thereby further avoiding water ripples generated when the backplate 211 contacts the back surface 80 of the handheld device 8.

Figure 3A:
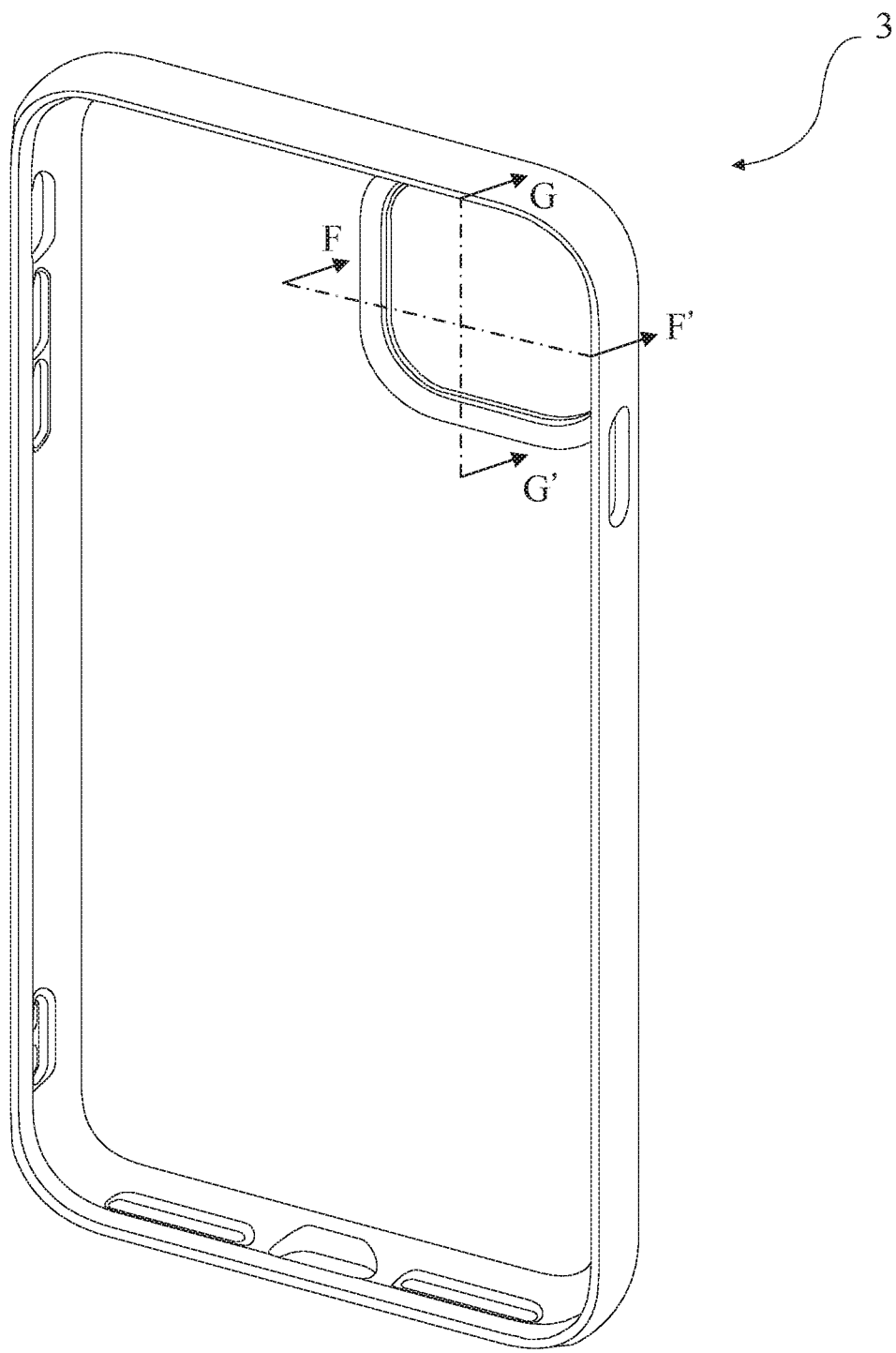
FIG. 3A is a three-dimensional diagram of a protection case assembly according to some embodiments of the present invention.
Figure 3B:
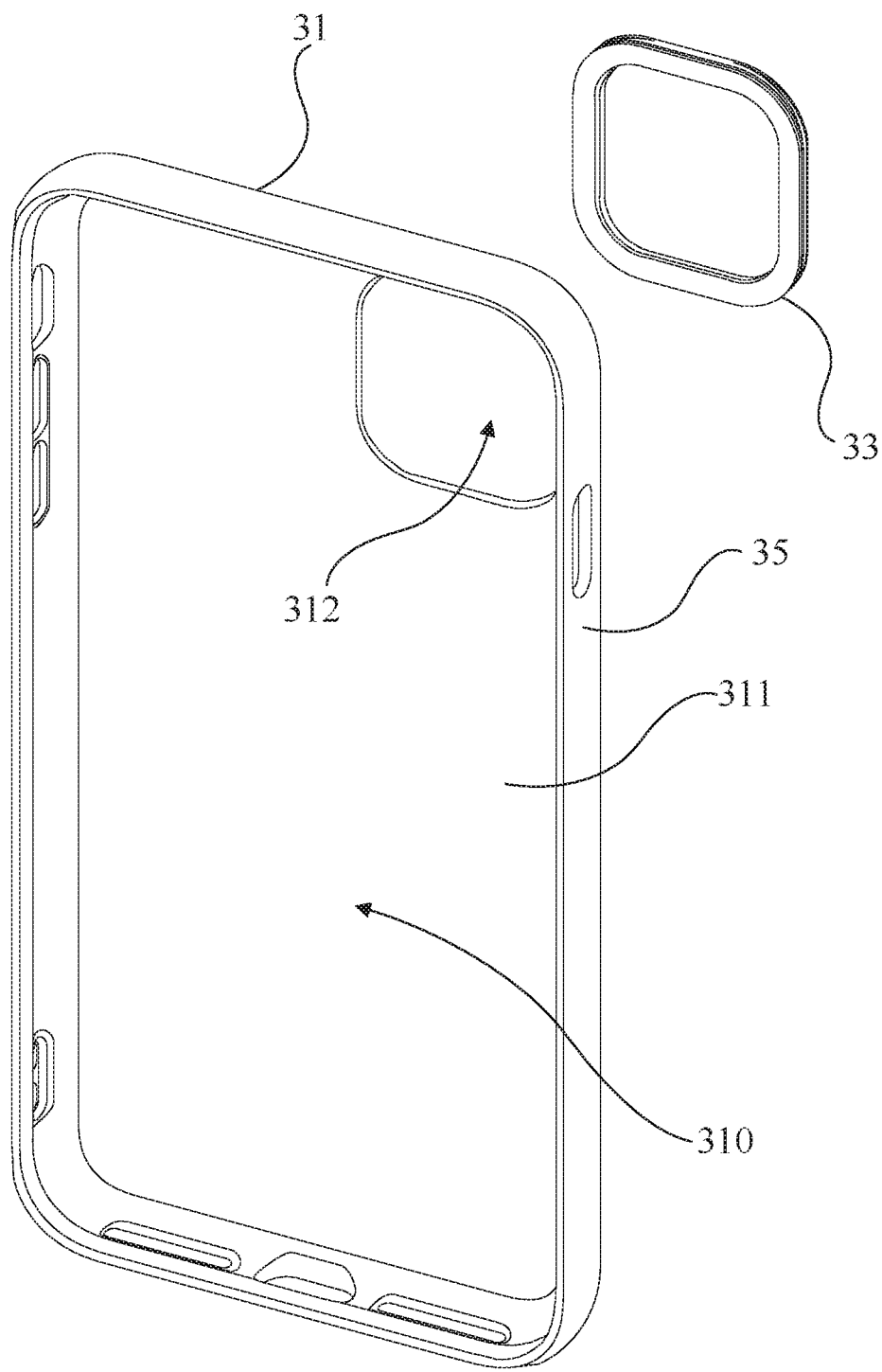
FIG. 3B is an exploded diagram of a protection case assembly according to some embodiments of the present invention.
Figure 3C:
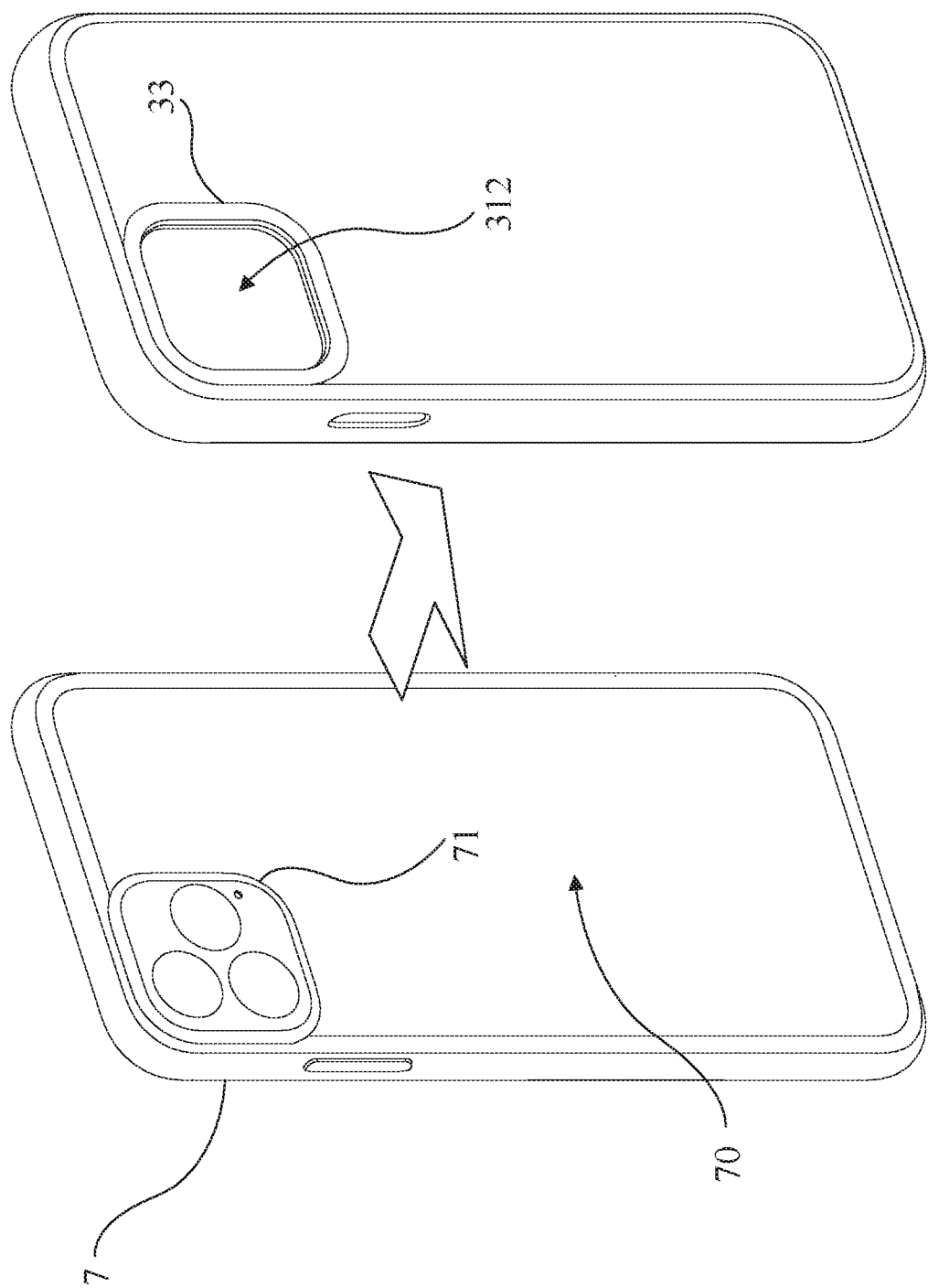
FIG. 3C is a schematic diagram of a protection case assembly in use according to some embodiments of the present invention.

Refer to FIG. 3A to FIG. 3C. FIG. 3A shows a three-dimensional diagram of a protection case assembly 3 according to some embodiments of the present invention. FIG. 3B shows an exploded diagram of the protection case assembly 3 according to some embodiments of the present invention. FIG. 3C shows a schematic diagram of the protection case assembly 3 in use according to some embodiments of the present invention. Specifically, the protection case assembly 3 includes a main case 31 and a frame 33. The main case 31 has an accommodating space 310 and a backplate 311.

In some embodiments, the accommodating space 310 of the main case 31 is defined by a frame 35 and the backplate 311 of the main case 31, and is configured to accommodate the handheld device 7. The handheld device 7 is detachably disposed in the accommodating space 310 of the main case 31. The handheld device 7 includes a lens module 71 provided on a back surface 70 of the handheld device 7. The main case 31 is provided with an opening 312 on a position corresponding to the lens module 71 so as to expose the lens module 71. The frame 33 is detachably disposed in the opening 312.

Figure 3D:
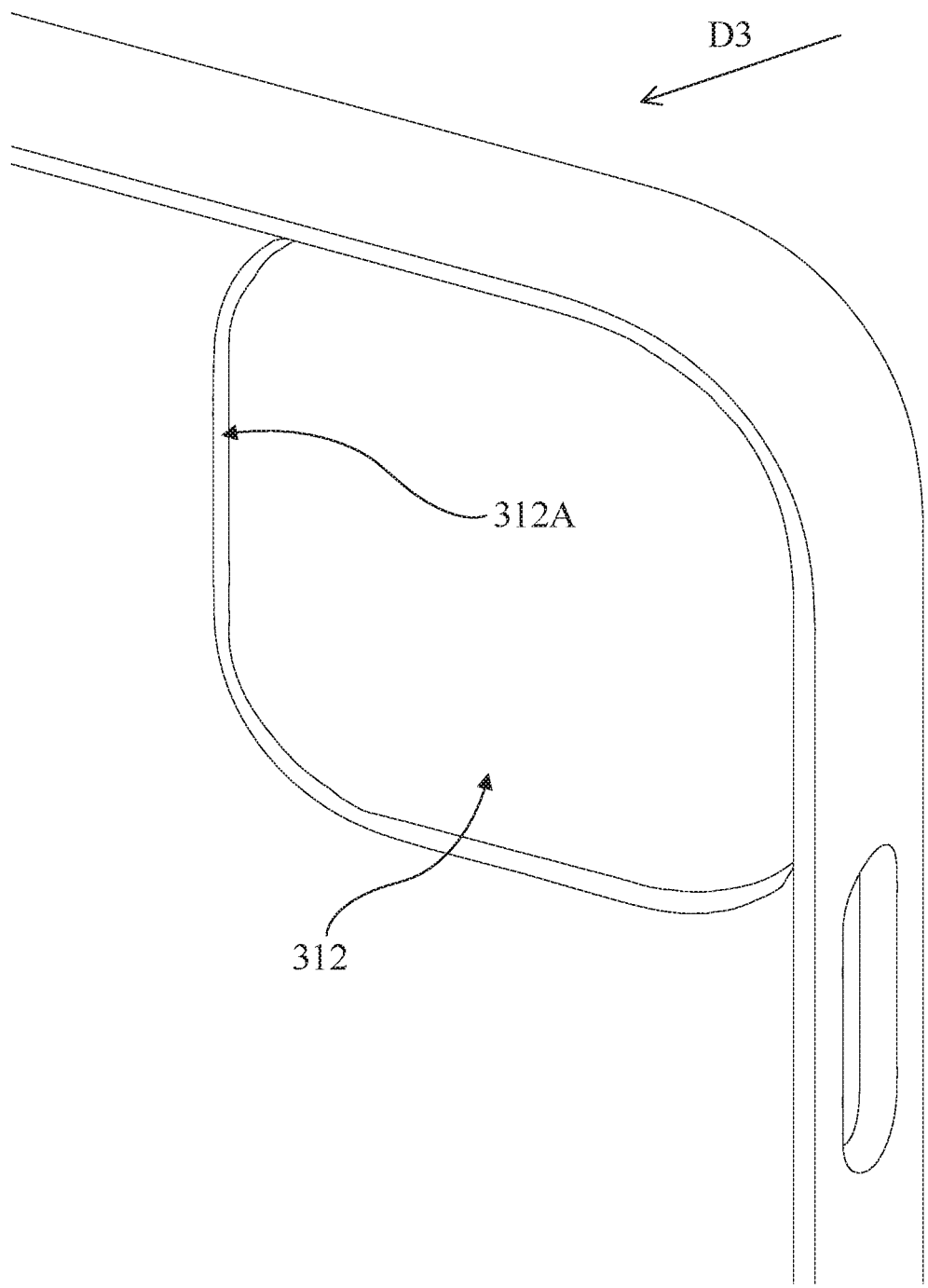
FIG. 3D is an enlarged partial diagram of a main case according to some embodiments of the present invention.
Figure 3E:
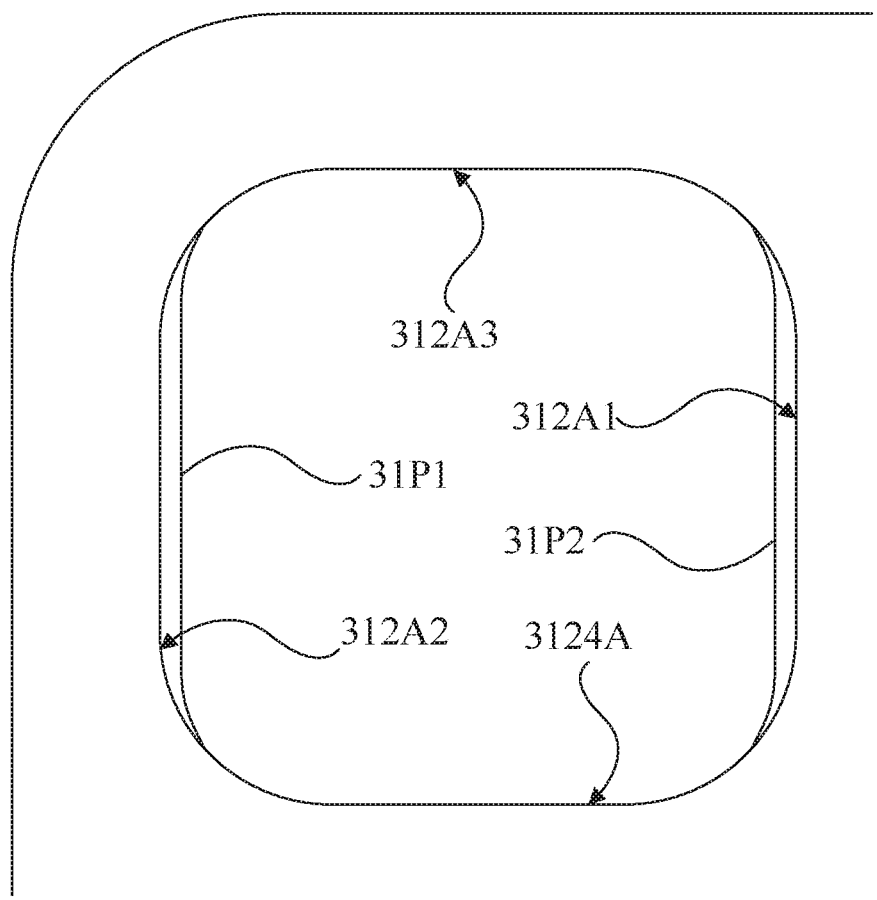
FIG. 3E is a front view of a main case according to some embodiments of the present invention.
Figure 3F:
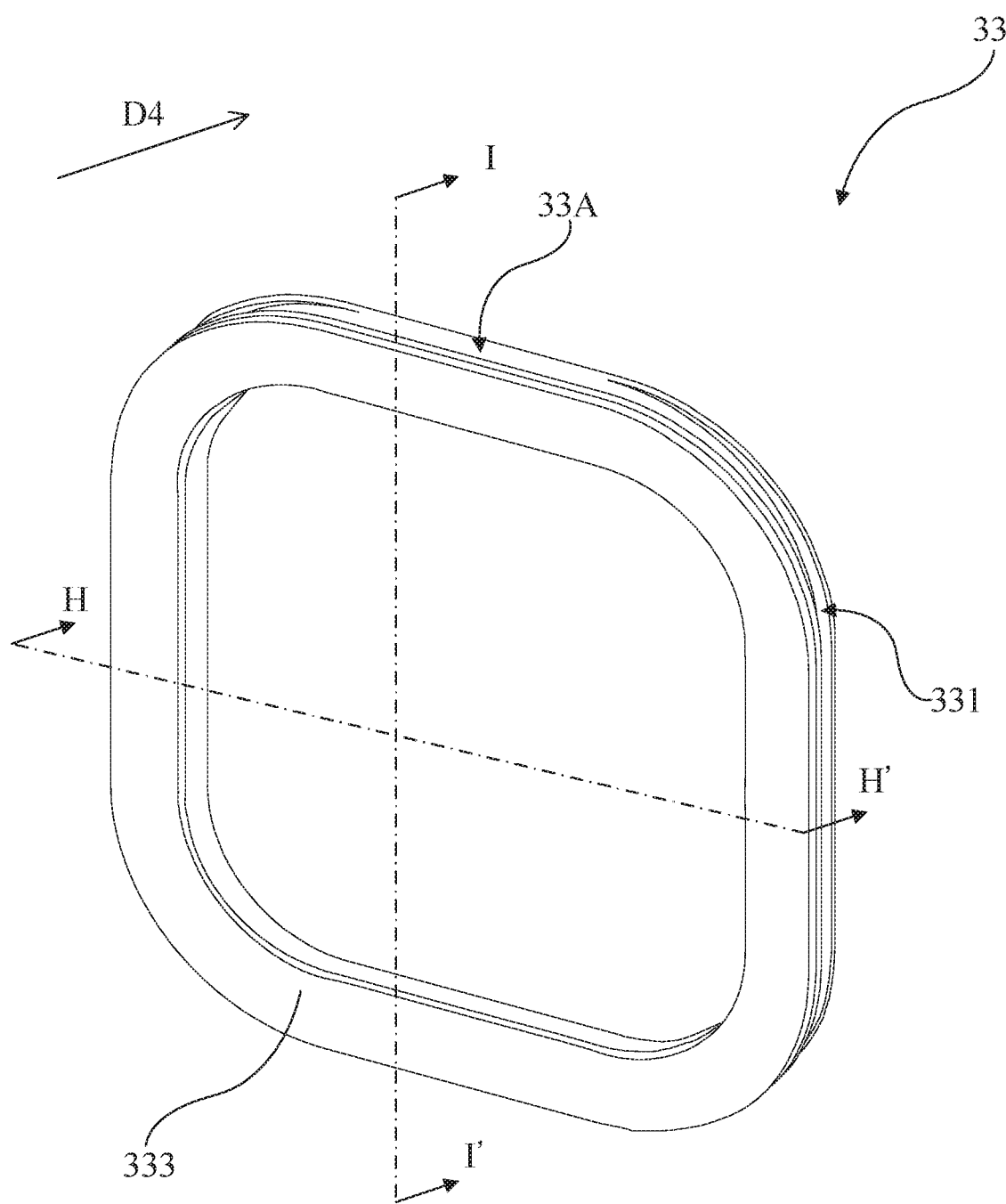
FIG. 3F is a three-dimensional diagram according to some embodiments of the present invention.
Figure 3G:
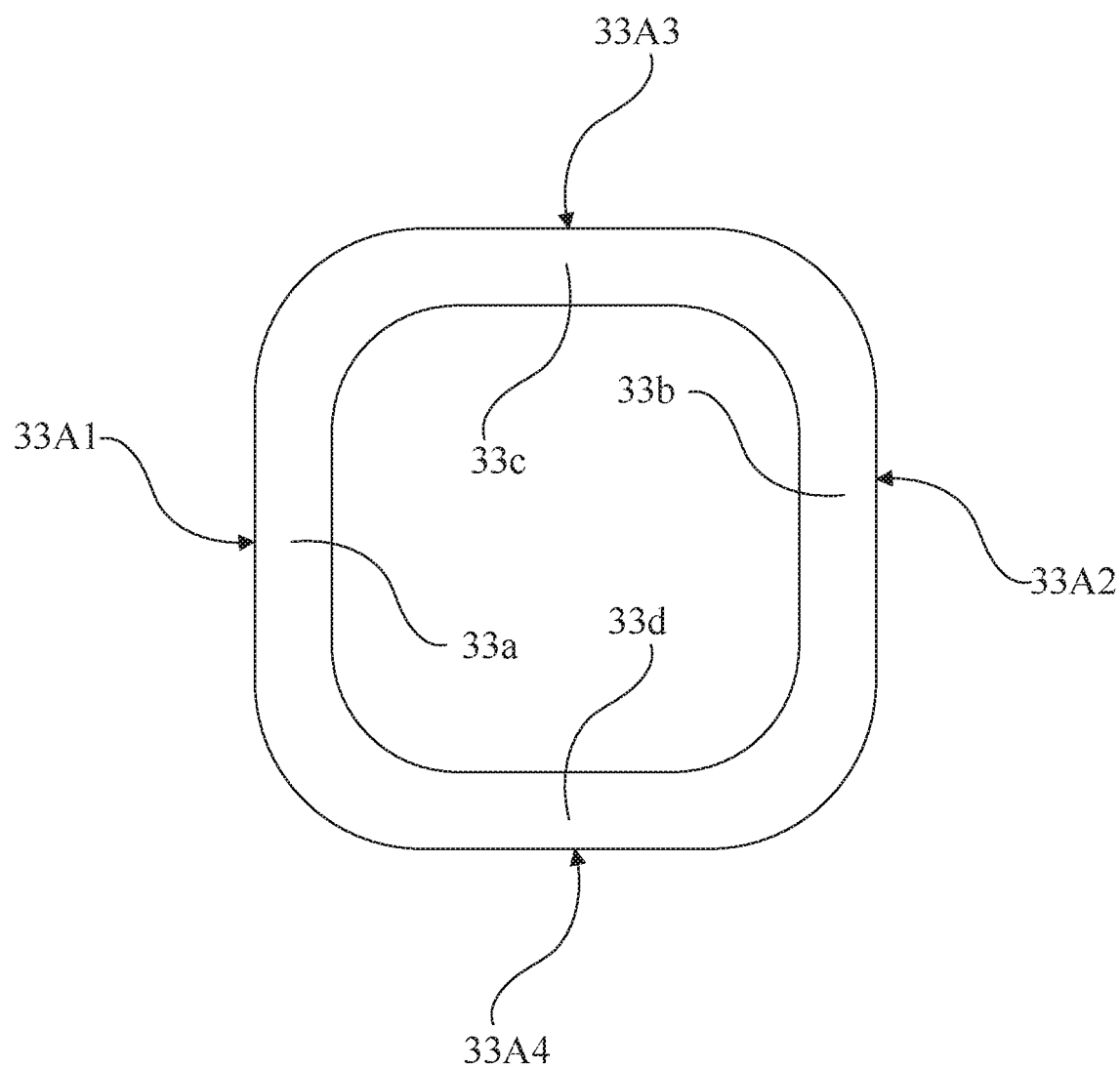
FIG. 3G is a front view of a frame according to some embodiments of the present invention.

Refer to FIG. 3D to FIG. 3G. FIG. 3D shows an enlarged partial diagram of the main case 31 according to some embodiments of the present invention. FIG. 3E shows a front view of the main case 31 in a direction D3 in FIG. 3D of the present invention. FIG. 3F shows a three-dimensional diagram of the frame 33 according to some embodiments of the present invention. FIG. 3G shows a front view of the frame 33 in a direction D4 in FIG. 3F of the present invention. Specifically, the opening 312 has an inner peripheral surface 312A encircling the opening 312. The inner peripheral surface 312A defines the hole of the opening 312, and is connected to an inner surface and an outer surface of the backplate 311. Corresponding to the inner peripheral surface 312A, the frame 33 has an outer peripheral surface 33A encircling the frame 33. A groove set 331 is formed on the outer peripheral surface 33A, and is configured to fittingly receive the main case 31 in the opening 312.

More specifically, in some embodiments, the inner peripheral surface 312A of the opening 312 may be divided into a first inner peripheral surface part 312A1, a second inner peripheral surface part 312A2, a third inner peripheral surface part 312A3 and a fourth inner peripheral surface part 312A4. In the opening 312, the first inner peripheral surface part 312A1 is opposite to the second inner peripheral surface part 312A2, and the third inner peripheral surface part 312A3 is opposite to the fourth inner peripheral surface part 312A4. In some embodiments, the third inner peripheral surface part 312A3 is adjacent to the first inner peripheral surface part 312A1 and the second inner peripheral surface part 312A2, and the fourth inner peripheral surface part 312A4 is adjacent to the first inner peripheral surface part 312A1 and the second inner peripheral surface part 312A2. In other words, the inner peripheral surface parts 312A1 to 312A4 are connected to form the inner peripheral surface 312A of the opening 312.

On the other hand, in some embodiments, the outer peripheral surface 33A of the frame 33 may be divided into a first outer peripheral surface part 33A1, a second outer peripheral surface part 33A2, a third outer peripheral surface part 33A3 and a fourth outer peripheral surface part 33A4.

In some embodiments, the third outer peripheral surface part 33A3 is adjacent to the first outer peripheral surface part 33A1 and the second outer peripheral surface part 33A2, and the fourth outer peripheral surface part 33A4 is adjacent to the first outer peripheral surface part 33A1 and the second outer peripheral surface part 33A2. In other words, the outerperipheral surface parts 33A1 to 33A4 are connected to form the outer peripheral surface 33A of the frame 33.

In some embodiments, the frame 33 may be distinguished into a first frame part 33a, a second frame part 33b, a third frame part 33c and a fourth frame part 33d based on the first outer peripheral surface part 33A1, the second outer peripheral surface part 33A2, the third outer peripheral surface part 33A3 and the fourth outer peripheral surface part 33A4. In some embodiments, the first frame part 33a is adjacent to the third 33c and the fourth frame part 33d, and the second frame part 33b is adjacent to the third frame part 33c and the fourth frame part 33d. In other words, the frame parts 33a to 33d are connected to form the frame 33.

In some embodiments, the first inner peripheral surface part 312A1 forms a protrusion 31P1, and the second inner peripheral surface part 312A2 form a protrusion 31P2. The protrusions 31P1 and 31P2 are disposed opposite to each other in the opening 312, and the thicknesses of the protrusions 31P1 and 31P2 are less than the thickness of the backplate 311. When the frame 33 is disposed in the opening 312, the first outer peripheral surface part 33A1 and the first frame part 33a correspond to the first inner peripheral surface part 312A1 and the protrusion 31P 1 the second outer peripheral surface part 33A2 and the second frame part 33b correspond to the second inner peripheral surface part 312A2 and the protrusion 31P2, the third outer peripheral surface part 33A3 and the third frame part 33c correspond to the third inner peripheral surface part 312A3, and the fourth outer peripheral surface part 33A4 and the fourth frame part 33d correspond to the fourth inner peripheral surface part 312A4.

Figure 3H:
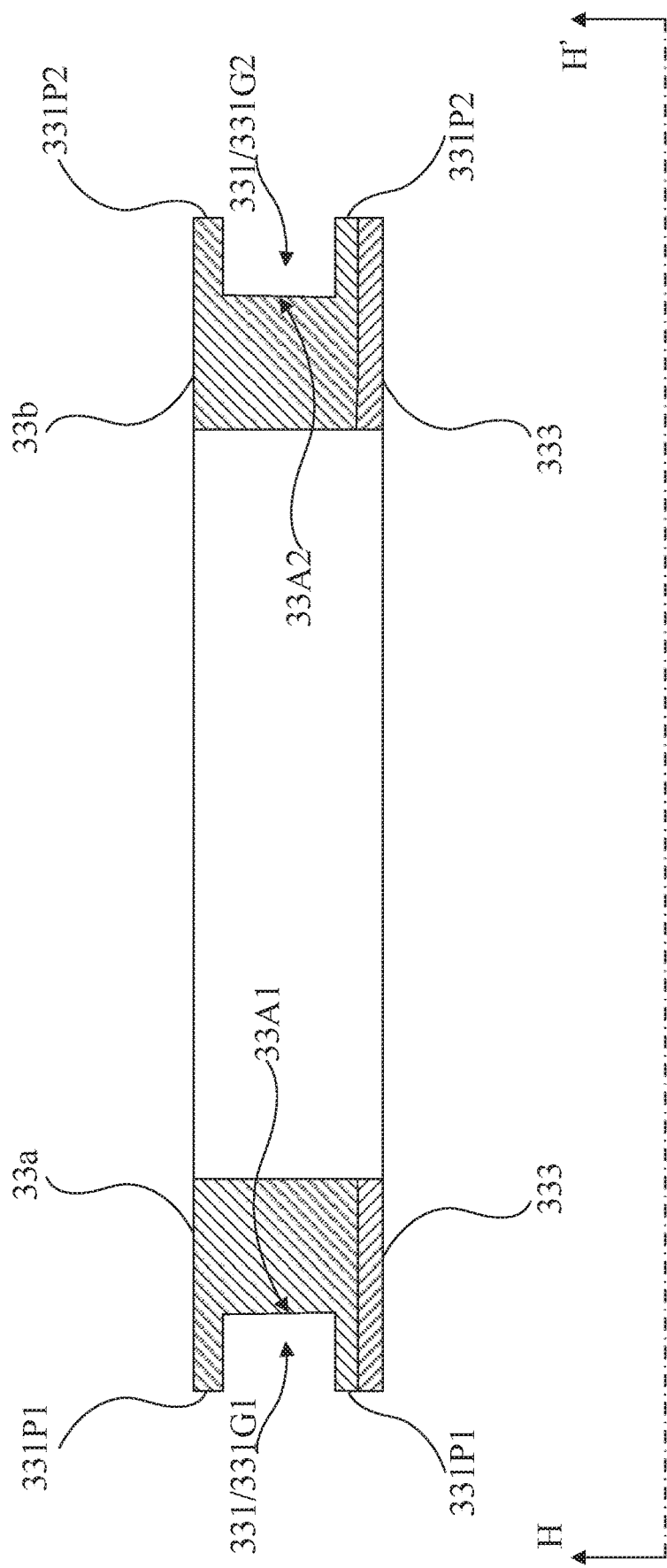
FIG. 3H is a section diagram of a frame according to some embodiments of the present invention.
Figure 3I:
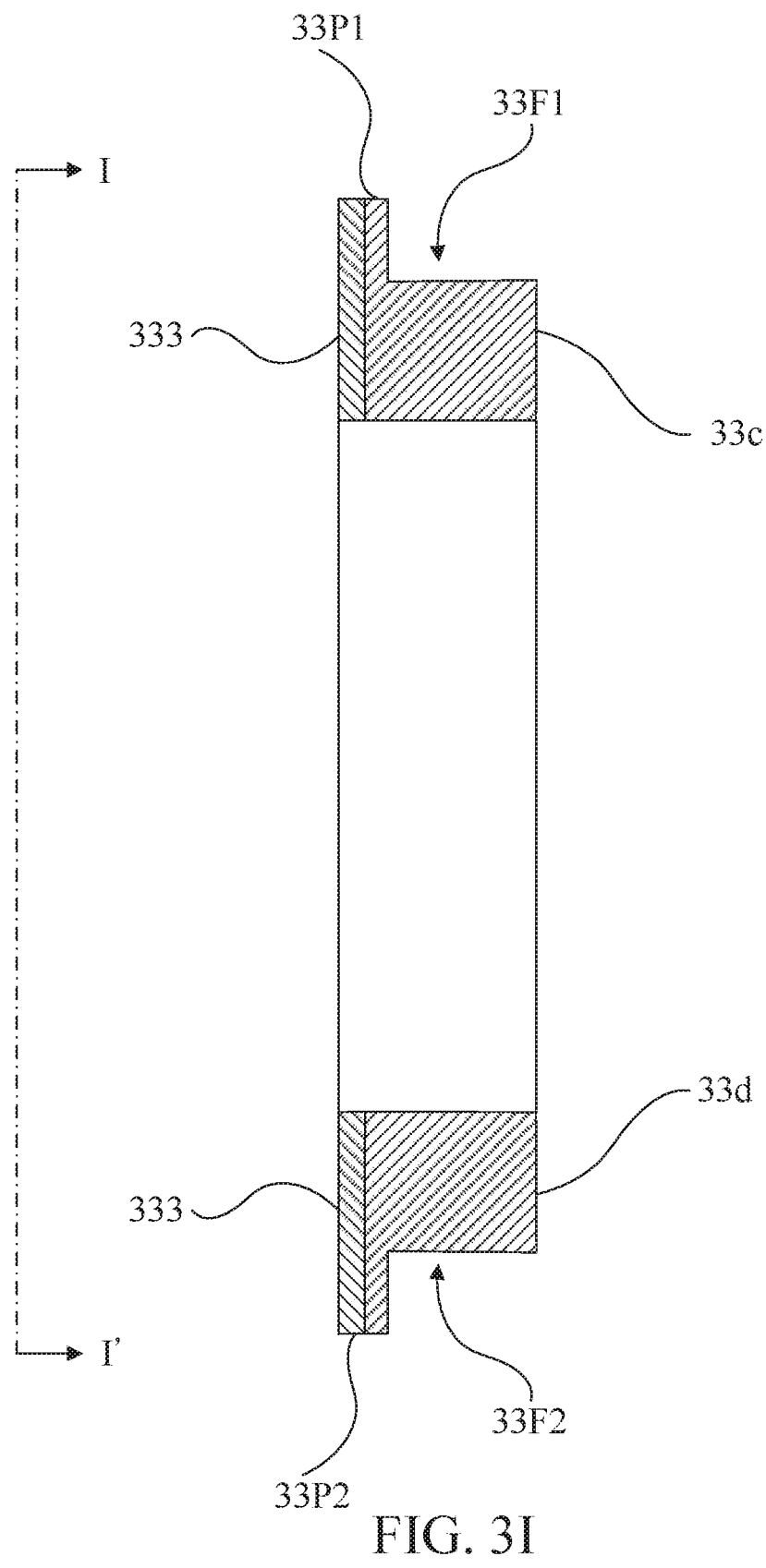
FIG. 3I is s section diagram of a frame according to some embodiments of the present invention.

Refer to FIG. 3H and FIG. 3I. FIG. 3H shows a section diagram of the frame 33 along the section line H-H' in FIG. 3F. FIG. 3I shows a section diagram of the frame 33 along the section line I-I' in FIG. 3F. Further, the groove set 331 of the frame 33 includes a first groove 331G1 and a second groove 331G2, the first groove 331G1 is formed on the first outer peripheral surface part 33A1 and includes two first protrusions 331P1, and the second groove 331G2 is formed on the second outer peripheral surface part 33A2 and includes two second protrusions 331P2.

More specifically, at the first frame part 33a, the two first protrusions 331P1 protrude on two ends of the first peripheral surface part 33A1 along the frame 33, and thus the two first protrusions 331P1 and the first outer peripheral surface part 33A1 jointly form the first groove 331G1. At the second frame part 33b, the two second protrusions 331P2 protrude on two ends of the second outer peripheral surface part 33A2 along the frame 33, and thus the two protrusions 331P2 and the second peripheral surface part 33A2 jointly form the second groove 331G-2.

On the other hand, at the third frame part 33b, the third outer peripheral surface part 33A3 of the frame 33 has a first flat area 33F1 and a protrusion 33P1. At the fourth frame part 33d, the fourth outer peripheral surface part 33A4 has a second flat area 33F2 and a protrusion 33P2. More specifically, the protrusion 33P1 protrudes only on one end of the third peripheral surface part 33A3 along the frame 33, and the other end of the third outer peripheral surface part 33A3 without any protrusion forms the flat area 33F1 along the frame 33. The protrusion 33P2 protrudes only on one end of the fourth outer peripheral surface part 33A4 along the frame 33, and the other end of the fourth outer peripheral surface part 33A4 without any protrusion forms the flat area 33F2 along the frame 33.

Figure 3J:
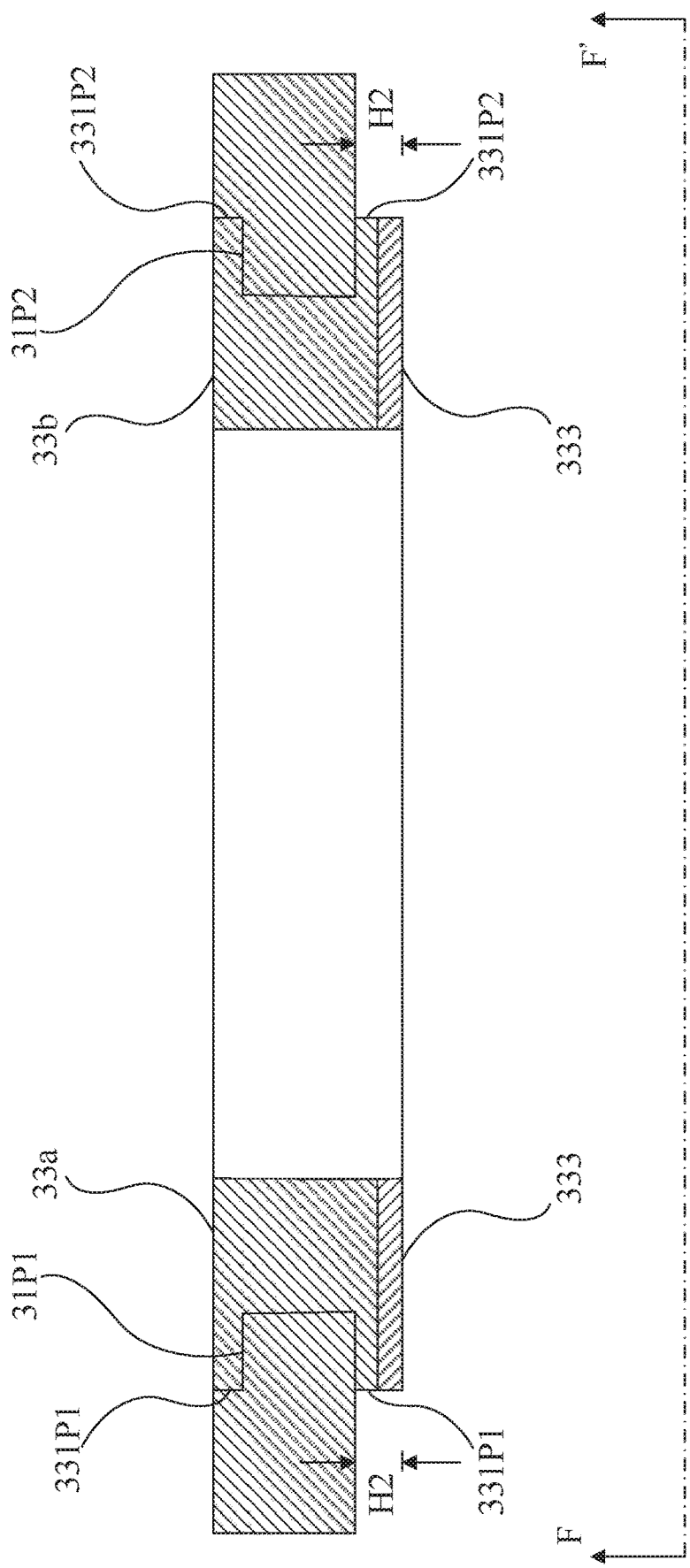
FIG. 3J is a section diagram of a protection case assembly according to some embodiments of the present invention.
Figure 3K:
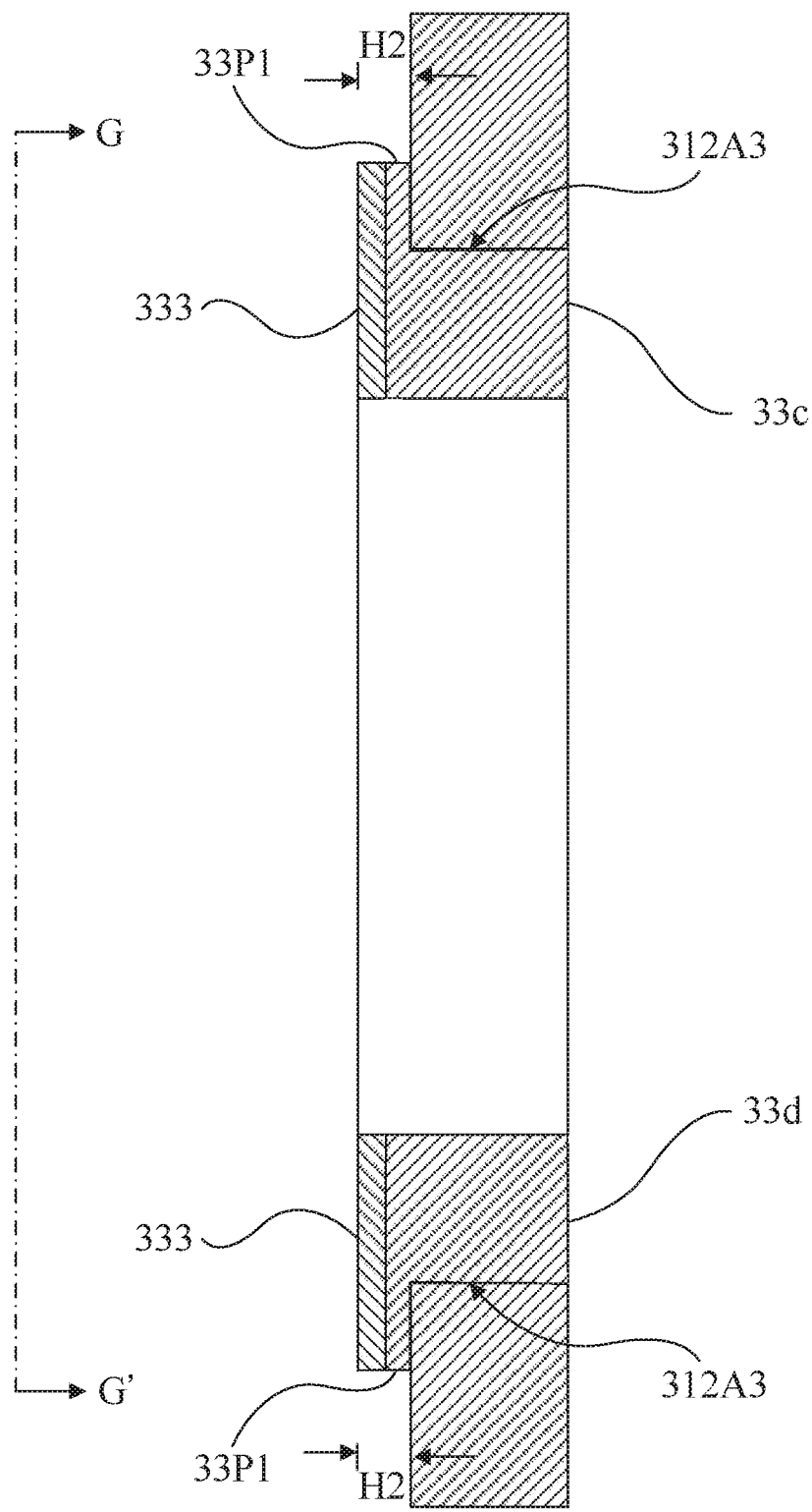
FIG. 3K is a section diagram of a protection case assembly according to some embodiments of the present invention.

Refer to FIG. 3J and FIG. 3K. FIG. 3J shows a section diagram of the protection case assembly 3 along the second line F-F' in FIG. 3A. FIG. 3K shows a section diagram along the section line G-G' in FIG. 3A. Specifically, when the frame 33 is disposed in the opening 312 of the backplate 311 of the main case 31: (1) the protrusion 31P1 formed on the first inner peripheral surface part 312A1 is fittingly received between the two first protrusions 331P1 of the first groove 331G1; (2) the protrusion 31P2 formed on the second inner peripheral surface part 312A2 is fittingly received between the two second protrusions 331P2 of the second groove 331G2; (3) the third inner peripheral surface part 312A3 is adjacent to the first flat area 33F1 of the third outer peripheral surface part 33A3, and the protrusion 33P1 is abutted against a surface of the backplate 311 facing the accommodating space 310; and (4) the fourth inner peripheral surface part 312A4 is adjacent to the flat area 33F2 of the fourth outer peripheral surface part 33A4, and the protrusion 33P2 is abutted against the surface of the backplate 311 facing the accommodating space 310.

In other words, it can be understand from the cross sections of the drawings, when the frame 33 is disposed in the opening 312 of the backplate 311 of the main case 31: (1) the first frame part 33a forms the first groove 331G1 toward the protrusion 31P1 of the first inner peripheral surface part 312A1, and the protrusion 31P1 of the first inner peripheral surface part 312A1 is fittingly received between the two first protrusions 331P1 of the first groove 331G1; (2) the second frame part 33b forms the second groove 331G2 toward the protrusion 31P2 of the second inner peripheral surface part 312A2, and the protrusion 31P2 of the second inner peripheral surface part 312A2 is fittingly received between the two second protrusions 331P2 of the second groove 331G2; (3) the third frame part 33c substantially forms an L shape on the cross section, and the protrusion 33P1 of the L shape is abutted against the surface of the backplate 311 facing the accommodating space 310; and (4) the fourth frame part 33d substantially forms an L shape on the cross section, and the protrusion 33P2 of the L shape is abutted against the surface of the backplate 311 facing the accommodating space 310.

In some embodiments, the thickness of the protrusion 31P1 less than the thickness of the backplate 311. Therefore, when: (1) the protrusion 31P1 is fittingly received between the two first protrusions 331P1 of the first groove 331G1; (2) the protrusion 32P1 is fittingly received between the two second protrusions 331P2 of the second groove 331G2; (3) the third inner peripheral surface part 312A3 is adjacent to the first flat area 33F1 of the third outer peripheral surface part 33A3; and (4) the fourth inner peripheral surface part 312A4 is adjacent to the second flat area 33F2 of the fourth outer peripheral surface part 33A4, the plane of the frame 33 facing the exterior and the outer plane of the backplate 311 are substantially coplanar. In other words, when the frame 33 is disposed in the opening 312, when observing from the outer side of the backplate 311 relative to the accommodating space 310, the frame 33 does not appear bulging relative to the outer plane of the backplate 311.

It should be noted that, in some embodiments, the cross section at the opening 312 shown in FIG. 3J crosses the cross section at the opening 312 shown in FIG. 3K, and the cross section in FIG. 3J and the cross section in FIG. 3K both cross an extension surface of the backplate 311. In some embodiments, the cross section at the opening 312 shown in FIG. 3J is substantially perpendicular to the cross section at the opening 312 shown in FIG. 3K, and the cross section in FIG. 3J and the cross section in FTG. 3K are both substantially perpendicular to an extension surface of the backplate 311.

In some embodiments, when the frame 33 is disposed in the opening 312 of the backplate 311 of the main case 31, a first flange 331P1 located in the accommodating space 310, the second flange 331P2 located in the accommodating space 310, a third flange 33P1 of the third outer peripheral surface part 33A3 and a flange 33P2 of the fourth outer peripheral surface part 33A4 are connected and from an encirclement.

In some embodiments, the frame 33 includes a pad portion 333. When the frame 33 is disposed in the opening 312, the pad portion 333 protrudes toward the accommodating space 310. Between the surface of the pad 333 facing the accommodating space 310 and the surface of the backplate 311 facing the accommodating space 310 is a height difference H2. With the height difference H2, the backplate 311 may be padded away from the back surface of the handheld device 7, so as to prevent the backplate 311 from directly contacting the back surface of the handheld device 7, thereby further avoiding water ripples generated when the backplate 311 contacts the back surface of the handheld device 7.

In some embodiments, when the main case 31 and the backplate 311 are made of a translucent (for example, transparent or partially transparent) and soft material, the frame 33 and the pad portion 333 may significantly pad the backplate 311 away from the back surface of the handheld device 7 so as to avoid water ripples. In some embodiments, when the main case 31 and the backplate 311 are made of a translucent and hard material, the frame 33 and the pad portion. 333 may even better pad the backplate 311 away from the back surface of the handheld device 7 and thus the effect of avoiding water ripples is even more noticeable.

In some embodiments, the height difference 112 between the protruding surface of the pad portion 333 and the surface of the backplate 311 is between 0.1 mm and 1 mm. In some embodiments, the height difference H2 between the protruding surface of the pad portion 333 and the surface of the backplate 311 is approximately 0.8 mm. In some embodiments, the pad portion 333 may in plural in. quantity, and the plurality of pad portions 333 are respectively arranged on different positions of the frame 33. In some embodiments, the shape of the pad portion 333 corresponds to the encirclement of the frame 33, and is disposed at the frame 33 correspondingly to the encirclement of the frame 33.

In some embodiments, the material hardness of the groove set 331 is more than the material hardness of the pad portion 333. Specifically, the material of the groove set 331 includes a hard material, such as acrylonitrile-butadiene-styrene copolymer (ABS), so as to enhance the stability of the frame 33 fittingly received at the main case 31. The material of the pad portion 333 includes a soft material, such as thermoplastic polyurethane (TPU), so as to avoid scratching of the is back surface 70 of the handheld device 7 caused by contacting the back surface 70 of the handheld device 7. Meanwhile, because a soft material has higher flexibility, the fitting effect with the back surface 70 of the handheld device 7 may be increased, hence preventing dust from entering from the opening 312 to a gap between the handheld device 7 and the backplate 311.

The embodiments are examples for describing the embodiments of the present disclosure and illustrating the technical features of the present disclosure, and are not to be construed as limitations to the protection scope of the present disclosure. Changes and equivalent arrangements that could be easily made by a person skilled in the art are to be encompassed within the scope of the present disclosure. The protection scopes of the disclosure are to be accorded with the appended claims.

What is claimed is:

1. A protection case assembly for a handheld device, the protection case assembly comprising:
a main case, comprising:
an accommodating space, configured to accommodate a handheld device;
an opening, provided correspondingly to a lens module of the handheld device; and
a backplate corresponding to a back surface of the handheld device, wherein the opening is provided on the backplate; and
a frame, detachably disposed in the opening, comprising:
a groove set, configured to receive the backplate of the main case in the opening; and
a pad portion, protruding toward the accommodating space when the frame is disposed in the opening, wherein a surface of the pad portion abuts the back surface of the handheld device to form a height difference, of which the height difference is between the back surface of the handheld device and a surface of the backplate facing the accommodating space;
wherein material hardness of the groove set is more than material hardness of the pad portion.

2. The protection case assembly of claim 1, wherein the opening has an inner peripheral surface, the frame has an outer peripheral surface corresponding to the inner peripheral surface, and the groove set comprises:
at least one groove, formed on the outer peripheral surface, configured to receive the main case in the opening.

3. The protection case assembly of claim 2, wherein the inner peripheral surface has a first inner peripheral surface part and a second inner peripheral surface part opposite to the first inner peripheral surface part, the outer peripheral surface has a first outer peripheral surface part corresponding to the first inner peripheral surface part and a second outer peripheral surface part corresponding to the second inner peripheral surface part, and the at least one groove comprises:
a first groove, formed on the first outer peripheral surface part, comprising:
two first protrusions, between which the main case is received; and
a second groove, formed on the second outer peripheral surface part, comprising:
two second protrusions, between which the main case is received.

4. The protection case assembly of claim 3, wherein the opening forms a third protrusion and a fourth protrusion on the first inner peripheral surface part and the second inner peripheral surface part, respectively, the third protrusion is received between the first protrusions, and the fourth protrusion is received between the second protrusions.

5. The protection case assembly of claim 3, wherein the inner peripheral surface has:
a third inner peripheral surface part, adjacent to the first inner peripheral surface part and the second inner peripheral surface part; and
a fourth inner peripheral surface part, opposite to the third inner peripheral surface part;
wherein, the outer peripheral surface has:
a third outer peripheral surface part, comprising:
a first flat area, corresponding to the third inner peripheral surface part; and
a third protrusion, abutted against a surface of the backplate facing the accommodating space; and
a fourth outer peripheral surface part, comprising:
a second flat area, corresponding to the fourth inner peripheral surface part; and
a fourth protrusion, abutted against the surface of the backplate facing the accommodating space.

6. The protection case assembly of claim 1, wherein the pad portion is provided at the frame corresponding to an encirclement of the frame.

7. The protection case assembly of claim 1, wherein between a surface of the pad portion facing the accommodating space and a surface of the backplate facing the accommodating space is a height difference.

8. The protection case assembly of claim 7, wherein the height difference is between 0.1 mm and 1 mm.

9. A protection case assembly for a handheld device, the protection case assembly comprising:
a main case, comprising:
an accommodating space, configured to accommodate a handheld device; and
a backplate, provided with an opening corresponding to a lens module of the handheld device; and
a frame, detachably disposed in the opening, comprising:
a first frame part, corresponding to a first inner peripheral surface part of the opening;
a second frame part, opposite to the first frame part, and corresponding to a second inner peripheral surface part of the opening;
a third frame part, corresponding to a third inner peripheral surface part of the opening;
a fourth frame part, opposite to the third frame part, and corresponding to a fourth inner peripheral surface part of the opening; and
a pad portion, protruding toward the accommodating space when the frame is disposed in the opening, wherein a surface of the pad portion abuts the back surface of the handheld device to form a height difference, of which the height difference is between the back surface of the handheld device and a surface of the backplate facing the accommodating space;
wherein, on a first cross section of the opening, the first frame part forms a first groove toward the first inner peripheral surface part, and the first inner peripheral surface is received between two protrusions of the first groove, and material hardness of the first groove is more than material hardness of the pad portion;
wherein, on a second cross section of the opening, the third frame part forms a first L shape, and a protrusion of the first L shape is abutted against the backplate from the accommodating space.

10. The protection case assembly of claim 9, wherein:
the first frame part is adjacent to the third frame part and the fourth frame part;
the second frame part is adjacent to the third frame part and the fourth frame part;
on the first cross section, the second frame part forms a second groove toward the second inner peripheral surface, and the second inner peripheral surface is received between the two protrusions of the second groove; and
on the second cross section, the fourth frame part forms a second L shape, and a protrusion of the second L shape is abutted against the backplate from the accommodating space.

11. The protection case assembly of claim 9, wherein the opening forms a protrusion on the first inner peripheral surface, the protrusion of the first inner peripheral surface is received between the two protrusions of the first groove, and on the first cross section, thickness of the protrusion of the first inner peripheral surface is less than thickness of the backplate.

12. The protection case assembly of claim 9, wherein the first cross section crosses the second cross section, and the first cross section and the second cross section individually cross an extension surface of the backplate.

13. A protection case assembly, configured to accommodate a handheld device, comprising:
   a main case, comprising
      a backplate corresponding to a back surface of the handheld device, wherein an opening is provided on the backplate; and
   a frame, detachably disposed in the opening of the main case, the frame conformingly encircling an inner peripheral surface of the opening when the frame is disposed in the opening of the main case and comprising:
      a pad portion, protruding toward the accommodating space when the frame is disposed in the opening, wherein a surface of the pad portion abuts the back surface of the handheld device to form a height difference, of which the height difference is between the back surface of the handheld device and a surface of the backplate facing the accommodating space;

wherein, the frame and the main case are mutually received by at least two different receiving structures, and the at least two different receiving structures comprise:
      a structure in which the frame and the main case are abutted by one single side; and
      a structure in which two walls of the frame clamp the main case,
   wherein each material hardness of the at least two different receiving structures is more than material hardness of the pad portion.

* * * * *